(12) United States Patent
Lapic et al.

(10) Patent No.: US 12,160,398 B2
(45) Date of Patent: Dec. 3, 2024

(54) COMMUNICATION SYSTEM FACILITATING DELIVERY OF A PREDEFINED MESSAGE TO END USER DEVICES ON INITIAL COMMUNICATIONS WITH AN ENTITY

(71) Applicant: ZIPWHIP, LLC, San Francisco, CA (US)

(72) Inventors: James Lapic, Kirkland, WA (US); Daniel Eric deMarteleire, Seattle, WA (US); Alan Thomas Capps, Monroe, WA (US); Carl Derline, Seattle, WA (US)

(73) Assignee: ZIPWHIP, LLC, San Francisco, CA (US)

( * ) Notice: Subject to any disclaimer, the term of this patent is extended or adjusted under 35 U.S.C. 154(b) by 0 days.

(21) Appl. No.: 18/138,722

(22) Filed: Apr. 24, 2023

(65) Prior Publication Data

US 2023/0262009 A1 Aug. 17, 2023

Related U.S. Application Data

(62) Division of application No. 17/317,664, filed on May 11, 2021, now Pat. No. 11,637,793.

(51) Int. Cl.
*H04L 51/02* (2022.01)
(52) U.S. Cl.
CPC .................................. *H04L 51/02* (2013.01)

(58) Field of Classification Search
CPC ......... H04L 51/00; H04L 51/02; H04L 51/04; H04L 51/08; H04L 51/18; H04L 51/216
See application file for complete search history.

(56) References Cited

U.S. PATENT DOCUMENTS

| | | | |
|---|---|---|---|
| 8,150,385 B1 | 4/2012 | Majeti | |
| 9,065,786 B2 | 6/2015 | Plotkin | |
| 9,374,693 B1 | 6/2016 | Olincy | |
| 9,456,084 B2 | 9/2016 | Segall | |
| 9,461,945 B2 | 10/2016 | Phillips | |
| 10,367,937 B1 | 7/2019 | Caldwell | |
| 10,389,880 B1 | 8/2019 | Boutcher | |
| 10,455,376 B2 | 10/2019 | Johnston | |
| 10,803,479 B2 | 10/2020 | Brigham | |
| 2004/0212505 A1* | 10/2004 | Dewing | A61B 5/0002 340/573.1 |
| 2008/0147795 A1 | 6/2008 | Heidloff | |
| 2009/0198783 A1 | 8/2009 | Bloomer, Jr. | |
| 2011/0077033 A1 | 3/2011 | Shuai | |
| 2013/0066999 A1* | 3/2013 | Adams | G06Q 10/107 709/206 |
| 2013/0097269 A1 | 4/2013 | Plotkin | |
| 2014/0163957 A1* | 6/2014 | Tesch | G06F 40/30 704/9 |

(Continued)

*Primary Examiner* — Johnny B Aguiar
(74) *Attorney, Agent, or Firm* — LOWENSTEIN SANDLER LLP

(57) ABSTRACT

Techniques for generating pre-defined outbound messages in response to a first inbound message or a first outbound message in a configured interval of time, including prioritization over configured autoreply messages. Source or destination messages conforming to business rules are sent to accompany outbound messages in particular orders and under particular circumstances.

20 Claims, 17 Drawing Sheets

(56) References Cited

U.S. PATENT DOCUMENTS

| | | |
|---|---|---|
| 2014/0229238 A1 | 8/2014 | Meyer |
| 2016/0173428 A1* | 6/2016 | Balasubramanian ........................ G06F 16/335 709/206 |
| 2017/0034087 A1* | 2/2017 | Borenstein .............. H04L 51/08 |
| 2017/0104863 A1* | 4/2017 | Turim ..................... G06F 16/23 |
| 2017/0163577 A1* | 6/2017 | Dowdell ................. H04L 51/02 |
| 2018/0152396 A1 | 5/2018 | Morris |
| 2019/0028858 A1* | 1/2019 | Johnston ................. H04W 4/08 |
| 2019/0306252 A1* | 10/2019 | Lebedev ............. H04L 12/1827 |

* cited by examiner

COMMUNICATION SYSTEM FACILITATING DELIVERY OF A PREDEFINED MESSAGE TO END USER DEVICES ON INITIAL COMMUNICATIONS WITH AN ENTITY

RELATED APPLICATIONS

This application is a divisional application of co-pending U.S. patent application Ser. No. 17/317,664, filed May 11, 2021, which is incorporated herein by reference.

BACKGROUND

Businesses subject to compliance rules and regulations may be challenged to maintain consistent compliant communications during initial customer contact or over long intervals between customer communications. The problem is compounded by the receipt of unsolicited or unprompted electronic communication from customers or potential customers.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
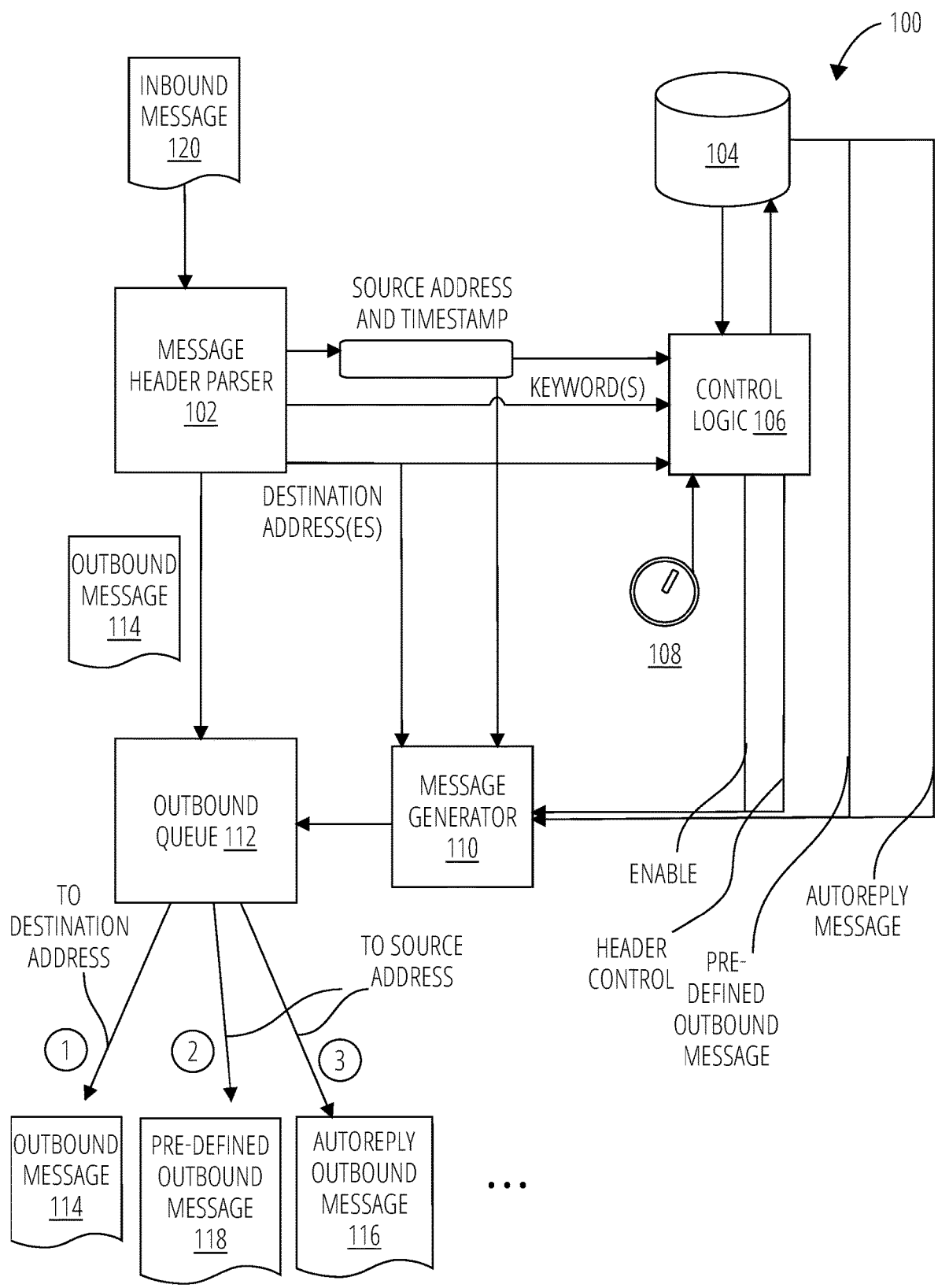
FIG. 1A depicts a communication server system 100 in accordance with one embodiment.

The methods and system disclosed herein may ensure that parties contacted through a communication system receives the appropriate compliance notices upon first contact. The system may be operated for business-to-business communications, from "users" to "customers" of the users. The system enables users with the flexibility to configure a system-generated text message response addressing two "first contact" scenarios with their customers: a first contact message that is an inbound message and a first contact message that is an outbound message. Herein the term "text message" should be understood to refer to messages communicated using SMS (Short Message Service) or similar technology (e.g., Multimedia Message Service, MMS) over cellular carrier networks.

Prior approaches to implementing and enabling compliance with first contact business rules for electronic communication are subject to inefficiencies and inaccuracies. For example, SMS messaging applications may enable the configuration of first rules that determine additional messages to accompany communications to certain destination addresses, such as autoreply messages. It may also be possible to configure rule sets on mobile phones for handling inbound SMS messages, e.g., from particular source addresses. However such endpoint-device centric solutions generate excess network link traffic that varies depending on the location of the mobile device, which may incur extra cost (e.g., in roaming situations). They tend to incur latency due to bandwidth and processing constraints on the endpoint device, especially when a large number of messages are involved or where cellular coverage is spotty. Further, messages originating in a certain sequence from such systems may be subject to becoming out of order when delivered to the destination address, again because of the unpredictable routes they may take, connectivity issues, and delays incurred over the intervening wide area network or networks between the endpoint devices. These technological inefficiencies and errors may become especially acute when 'bulk texting'—wherein an SMS message from a single source is directed to a (potentially) large group of destination addresses.

The disclosed mechanisms enable a triggered text response to be sent to a customer recipient when a first contact message is "inbound," meaning it originated from the customer or prospective customer to a text enabled line. ("Line" herein refers to a telecommunication address, such as a phone number). A triggered text response may also be sent trailing a "first outbound" message from a text enabled business line.

A system-generated message may be delivered to customers and prospective customers upon first contact. A user of the device sending and receiving the messages may be restricted from modifying these system-generated messages, ensuring that conversation transcripts with customers always have the appropriate compliance language at the beginning (or other appropriate points) of the engagement with customers. For example, the disclosed system may be used to ensure customers know how to opt-out, receive texting terms or disclosures, and are made aware of applicable fraud, data protection, and/or spam policies, at appropriate times and intervals. The disclosed methods and system may provide customers useful information such as links to account information or company directions and may ensure customers and prospects receive a corporate-controlled, consistent experience with critical information.

The disclosed system may send triggered responses of a limited character length. A first contact message triggered by an inbound message may be sent before any line-configured autoreply or office hour autoreply messages. A first contact message triggered by an inbound message may also be sent before any line-configured keyword responses. A first contact message triggered by an outbound message may immediately follow the first outbound message on a line. When a business user sending the first outbound message to a line has a custom signature enabled, the signature may be included in the first outbound message, and the first contact message may follow (e.g., without the signature).

The disclosed methods and system allow compliance language to be maintained under corporate control, with no need for user-level signatures or line-level autoreplies containing compliance language. The language configured in the system for inbound and outbound first contact messages may be updated in the system and updates to the first contact message language may reset the first contact trigger for all lines in the system utilizing the first contact message. The first contact message trigger may also be reset after a period of time. For a configured interval of reset time, the first contact message may be sent after the configured time period has passed and once after every indicated time period going forward. "Configured interval" refers to a time interval configured persistently in the system and prior to the actions or events that trigger transmission of the pre-defined outbound message.

Figure 1B:
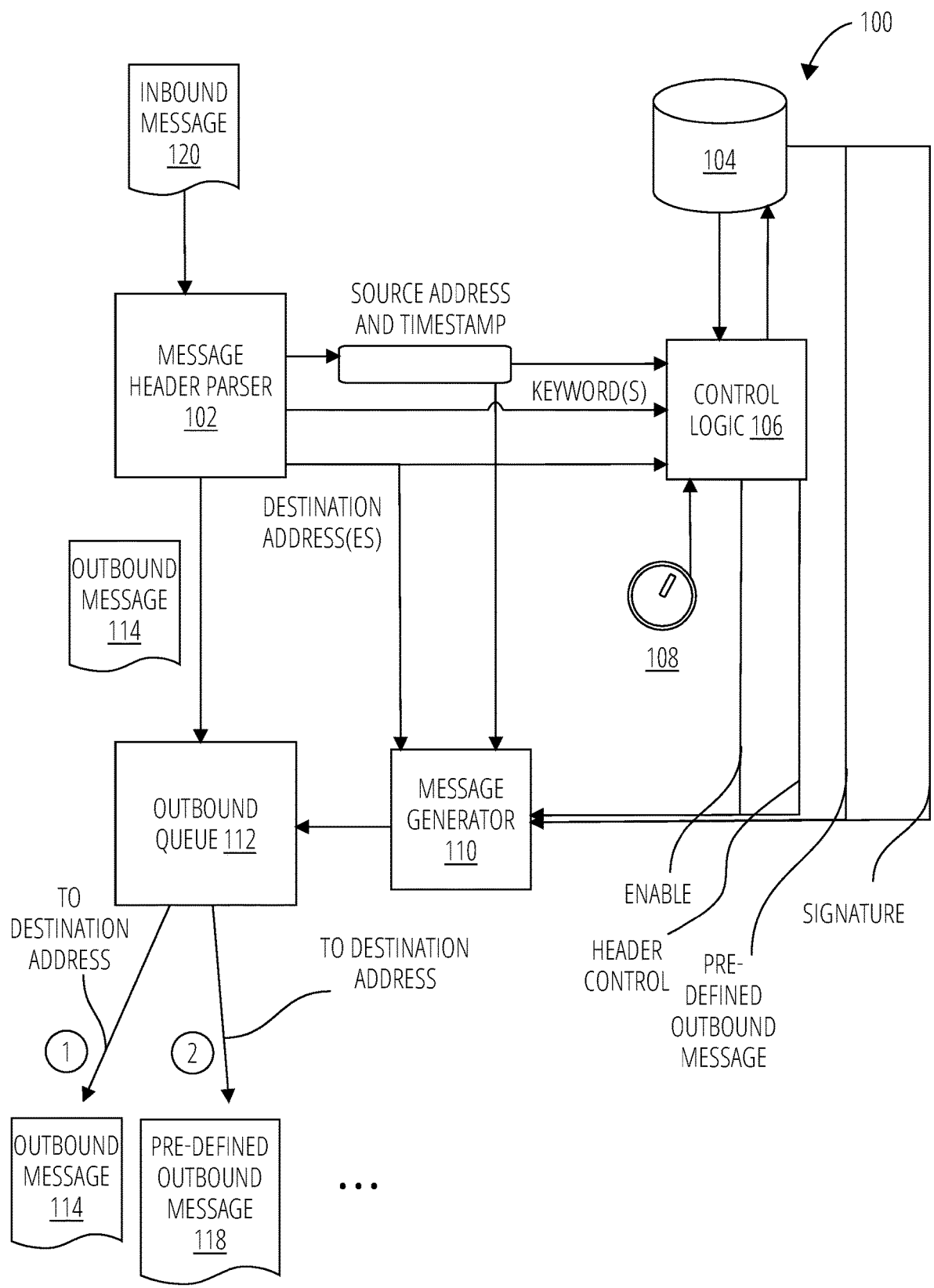
FIG. 1B depicts additional aspects of the communication server system 100 in accordance with one embodiment.
Figure 1C:
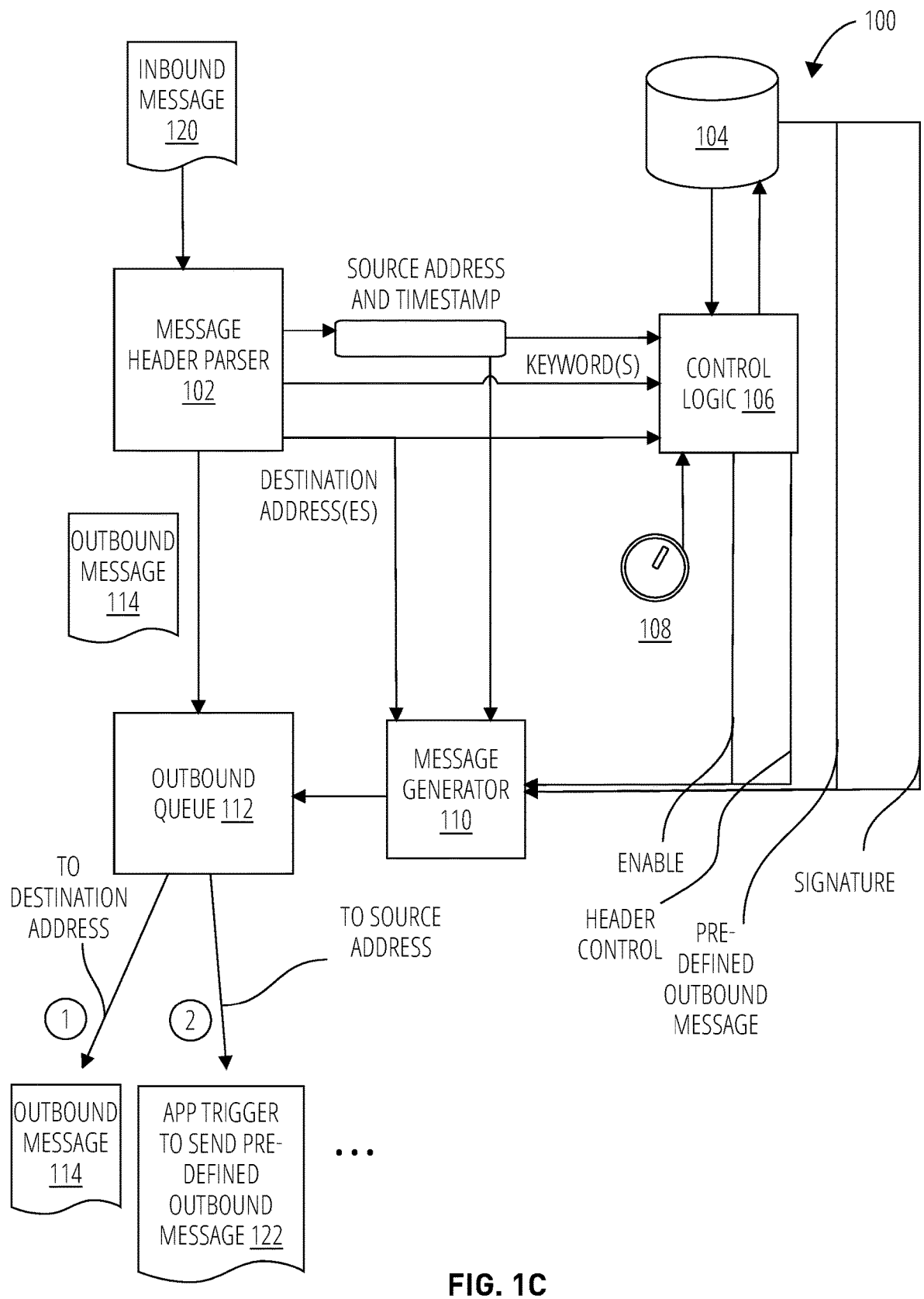
FIG. 1C depicts additional aspects of the communication server system 100 in accordance with one embodiment.
Figure 2A:
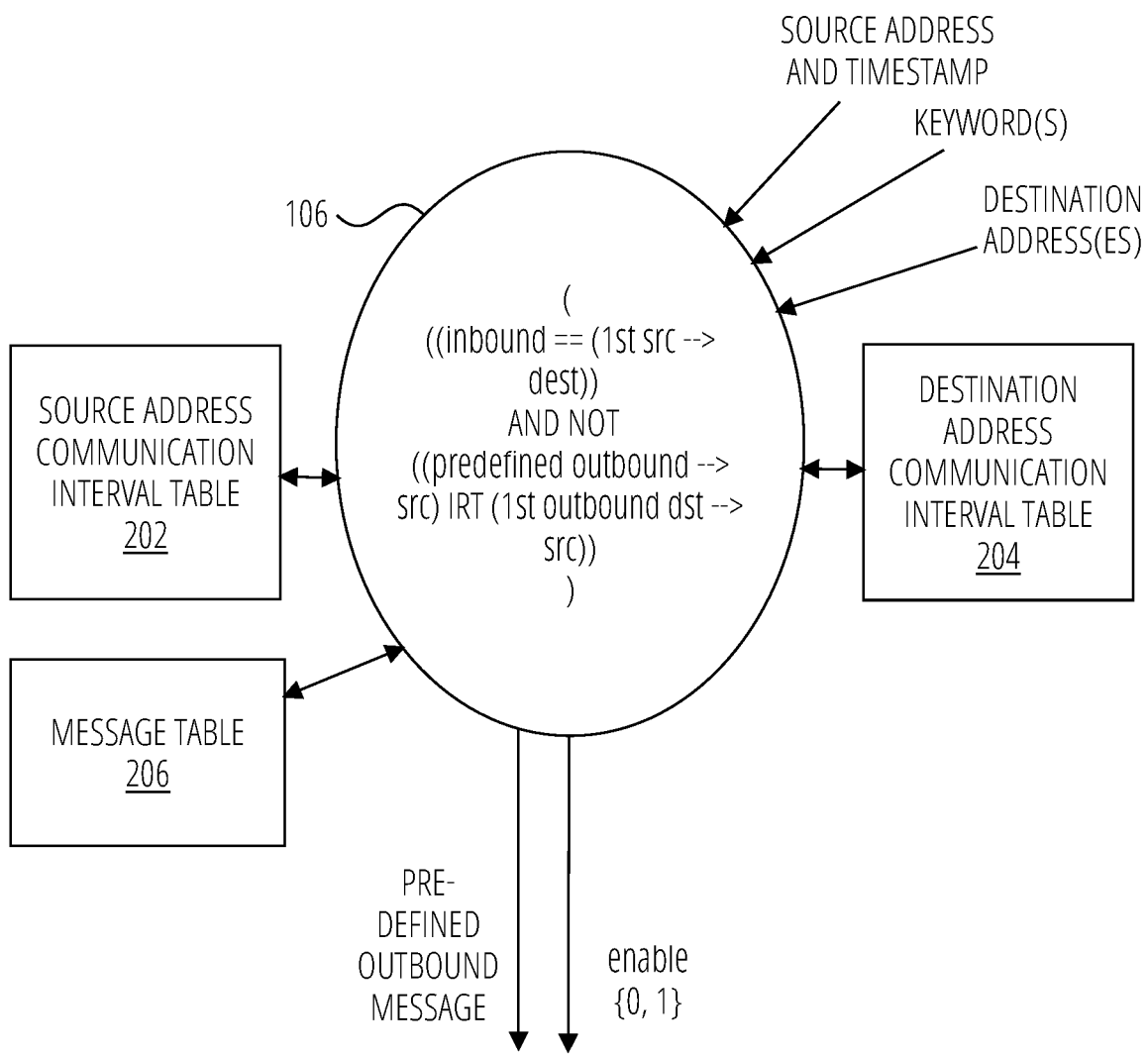
FIG. 2A depicts control logic 106 in accordance with one embodiment.
Figure 2B:
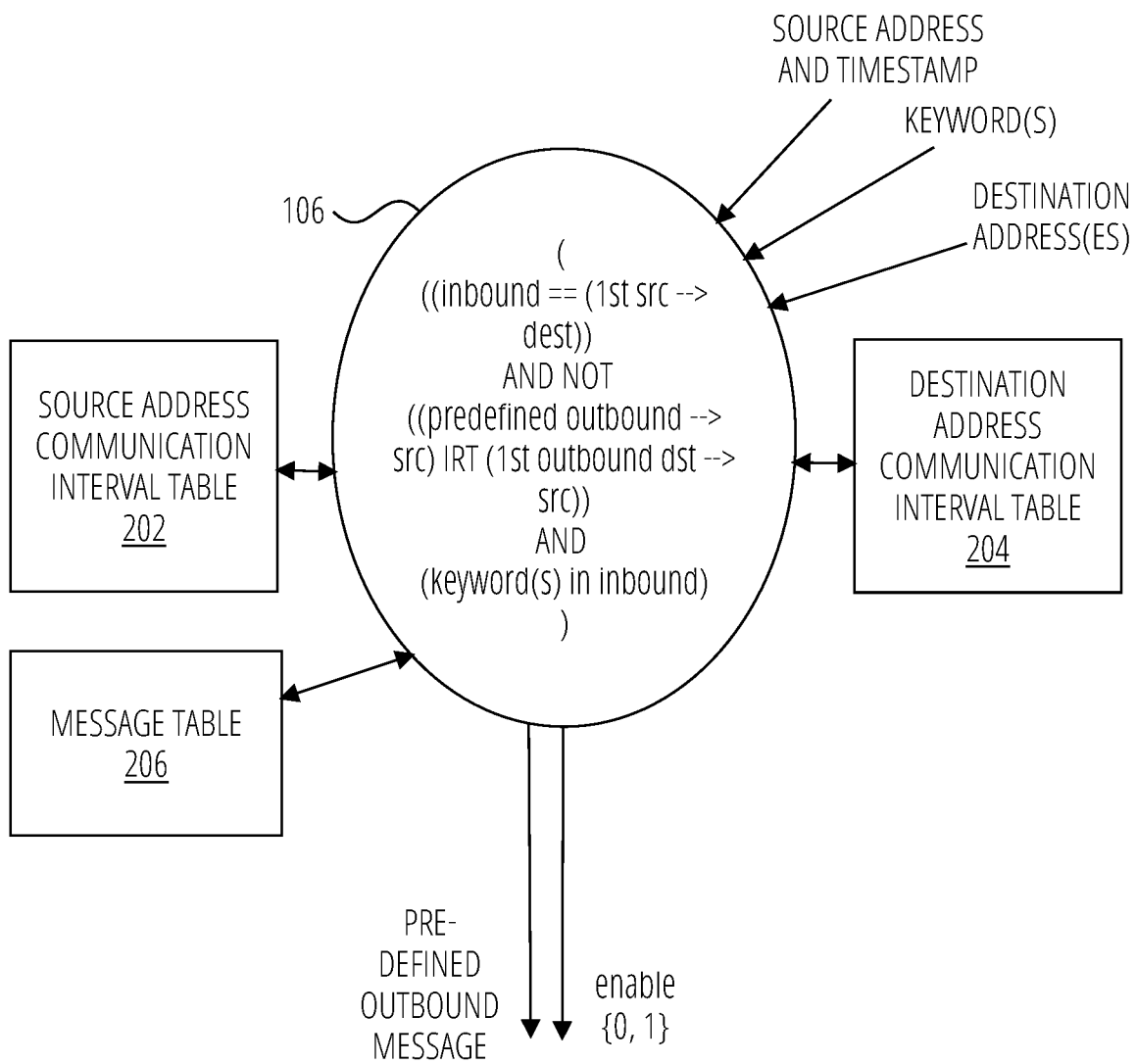
FIG. 2B depicts additional aspects of the control logic 106 in accordance with one embodiment.
Figure 2C:
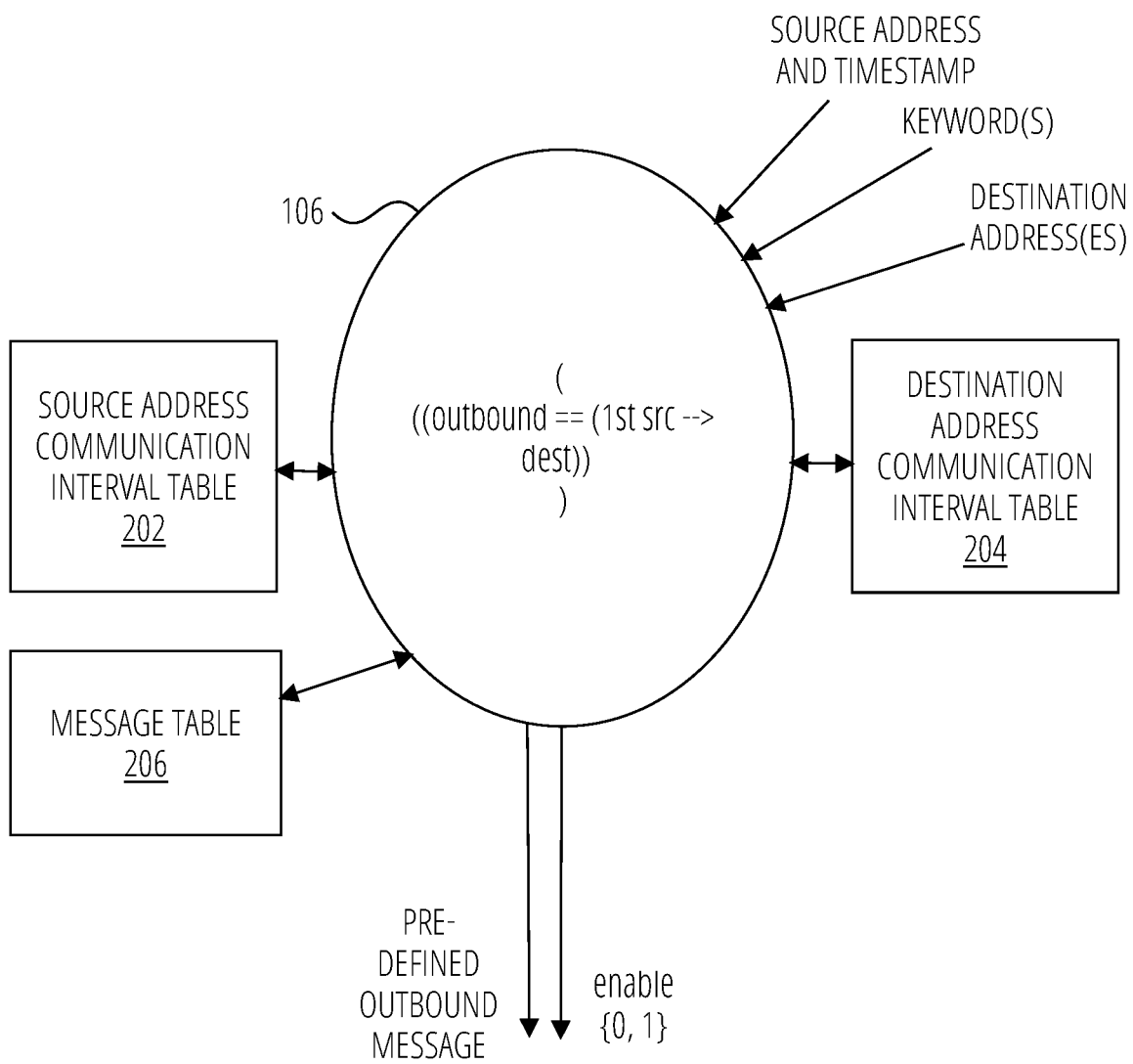
FIG. 2C depicts additional aspects of the control logic 106 in accordance with one embodiment.
Figure 2D:
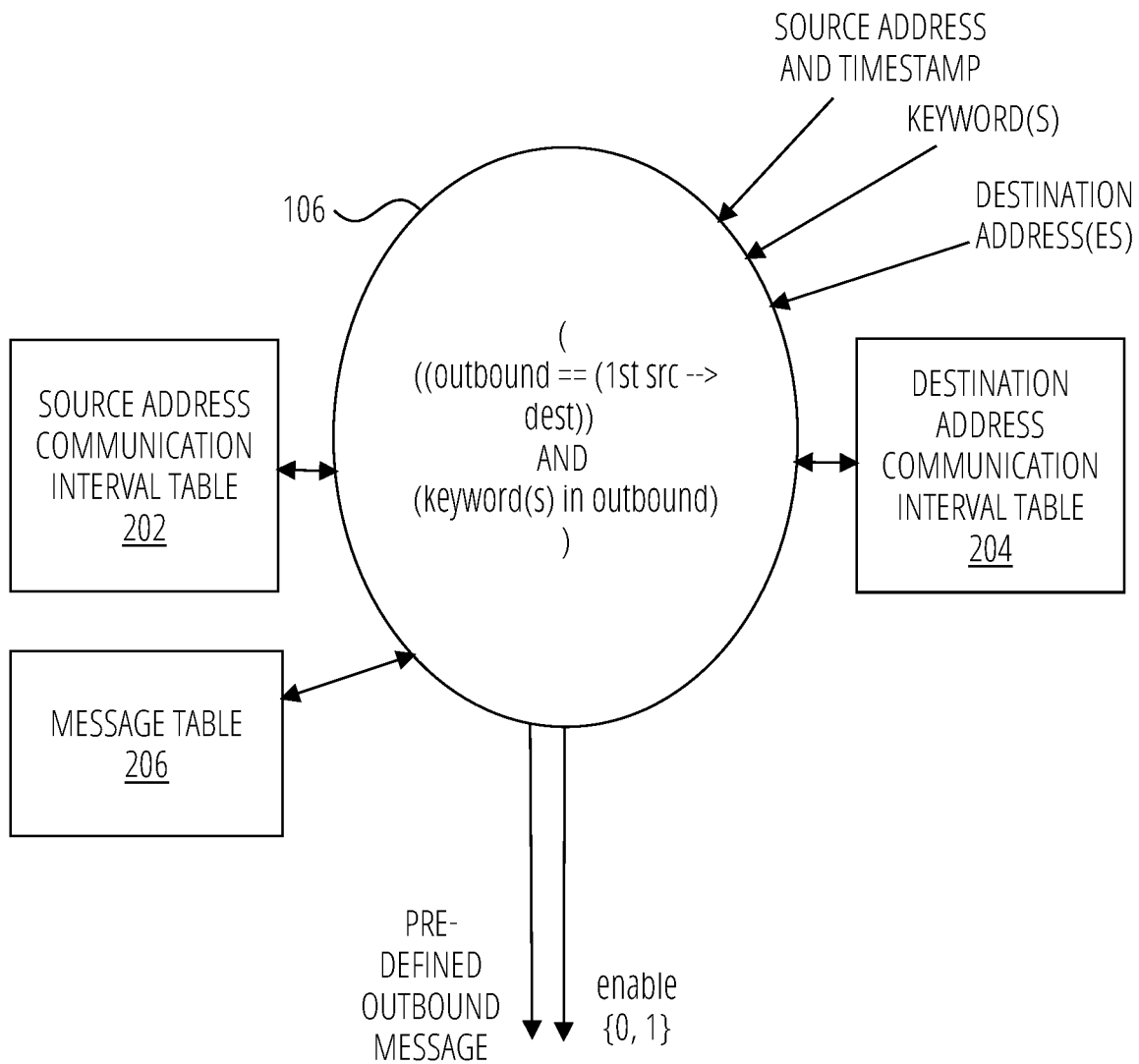
FIG. 2D depicts additional aspects of the control logic 106 in accordance with one embodiment.

FIG. 1A-FIG. 1C depict a communication server system 100 in one embodiment. An inbound message 120 from a first user device having a source communication address is received at a message header parser 102 that extracts the source communication address, timestamp, one or more destination communication addresses, and keyword(s) from the inbound message 120. The inbound message 120 may in some cases specify a group address that the communication server system 100 resolves into one or more destination communication addresses, in manners known in the art (e.g., by looking up the associated destination communication addresses in the tracking database 104).

These parameters are provided to control logic 106 that interacts with a tracking database 104 to determine messages to generate in response to the inbound message 120. The control logic 106 accesses and also updates various tables in the tracking database 104 are further elaborated in conjunction with FIG. 2A-FIG. 2D. The control logic 106 may receive inputs from an interval timer 108 to maintain some of these tables within a configured rolling time interval. Logic (e.g., software routines and/or modules) to parse messages, e.g. SMS messages, to extract the various parameters is well known and understood in the art. Likewise, logic to maintain tables in accordance with a rolling time interval is well known and understood.

The control logic 106 interacts with the tracking database 104 to obtain one or more pre-defined outbound message configured for the source communication address (e.g., per destination communication address in the inbound message 120, per keyword in the inbound message 120, or combinations of these). Likewise the control logic 106 may interact with the tracking database 104 to obtain one or more autoreply message. One condition that such such messages are configured in the tracking database 104, the control logic 106 enables a message generator 110 to generate outbound messages (e.g., outbound message 114, pre-defined outbound message 118, and autoreply outbound message 116) in a specific order in the outbound queue 112. The control logic 106 may also generate a control signal to the message generator 110 to indicate whether to send the outbound messages to the destination communication address(es) or, in an alternative, to send the outbound messages as messages to trigger an app in the first user device to send the outbound messages (app trigger to send pre-defined outbound message 122). Logic to form and generate messages, e.g., SMS messages, are well known and understood in the art.

A pre-defined outbound message 118, and/or autoreply outbound message 116, and or app trigger to send pre-defined outbound message 122 may be generated by the control logic 106 to accompany the outbound message 114 for each destination communication address specified in the inbound message 120 or associated with a group address specified in the inbound message 120.

In either scenario, the outbound messages may appear to users of the second device(s) comprising the destination communication address(es) as originating from the first user device. The alternate scenario may be advantageous to enable the end point device users to configure the pre-defined outbound messages and autoreply messages on their devices rather than on the communication server system 100. In either scenario, reliability and consistency of communications is improved, and the communication server system 100 controls the order of the outbound messages and the conditions under which they are sent, addressing many or all of the inefficiencies of the prior approaches.

The inbound message 120 is queued in an outbound queue 112 as an outbound message 114 to a second user device at a destination communication address.

FIG. 2A-FIG. 2D depict control logic 106 in one embodiment. The control logic 106 provides queries to a source address communication interval table 202 and a destination address communication interval table 204 to determine whether inbound and/or outbound messages were communicated between the source communication address and the destination communication address within a configured time interval. The control logic 106 queries a message table 206 for an appropriate outbound message or messages (possibly including autoreply messages) that fit the circumstances.

Figure 3:
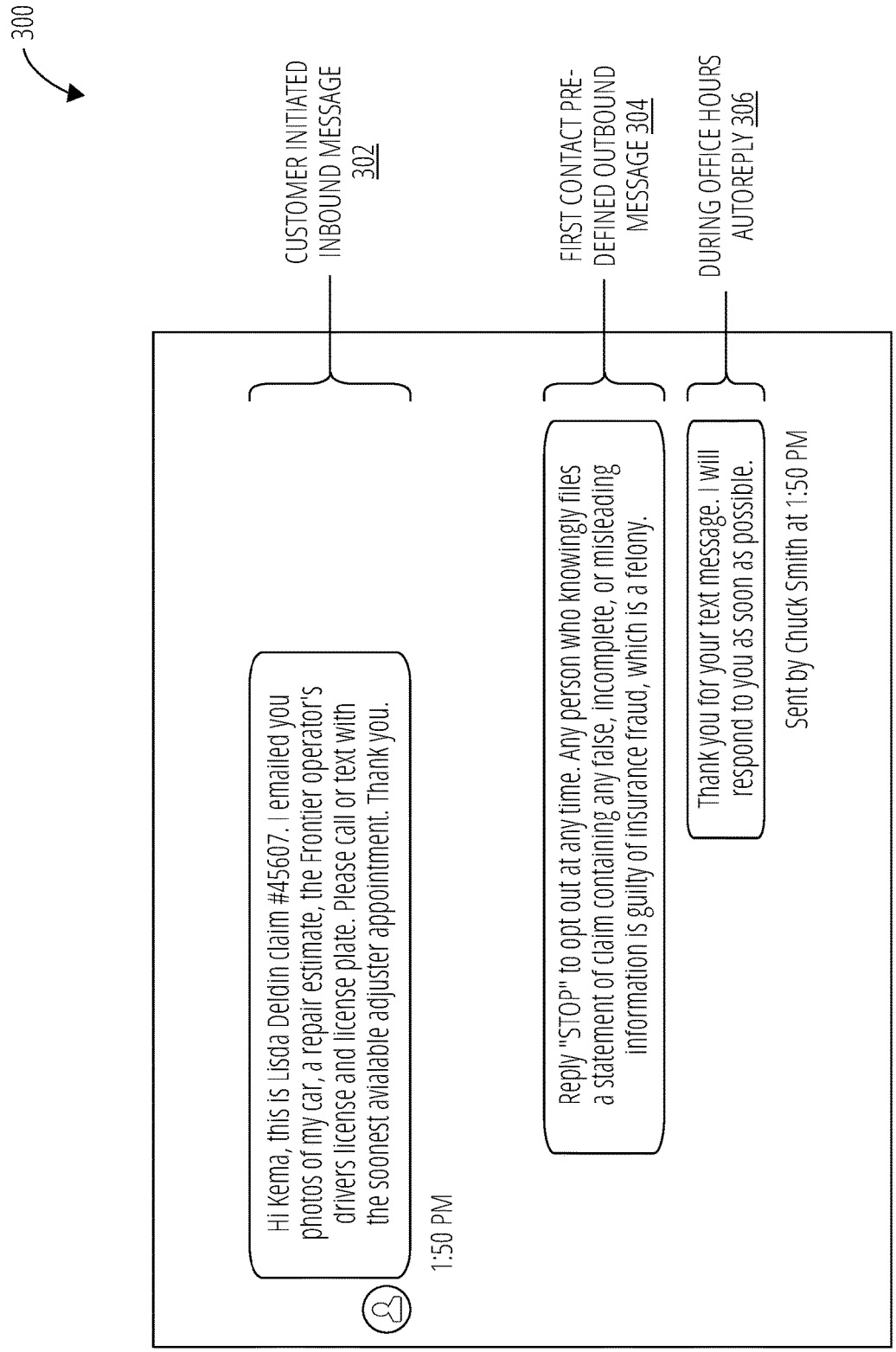
FIG. 3 depicts a communication sequence 300 in accordance with one embodiment.

FIG. 3 depicts a communication sequence 300 in accordance with one embodiment. The communication sequence 300 comprises a customer initiated inbound message 302, a first contact pre-defined outbound message 304, and a during office hours autoreply 306. "Pre-defined outbound message" refers to an outbound message configured into the system persistently and prior to the actions or events that trigger transmission of the pre-defined outbound message.

A customer initiated inbound message 302 may be sent by a customer seeking service or help from a system user via a text enabled line, such as a cell phone number associated with an SMS messaging account. Specific actions may be triggered in the system upon the customer initiated inbound message 302 being received by the disclosed system, independent of direct action by a message recipient. Specifically, these actions may be triggered on a server system intermediating between two client devices, such as cell phones, that are exchanging messages. This includes intermediating and prioritizing autoreply messages.

The disclosed system may also detect that the customer initiated inbound message 302 is the first message from that customer received at the system (overall, or in a configured interval) and may take additional actions in such a case. For example, should a customer contact a company having a policy for providing an initial disclaimer, the system may send a first contact pre-defined outbound message 304 including the disclaimer. The first contact pre-defined outbound message 304 may be generated by a server system intermediating communication between the source and destination devices of the messages. The first contact pre-defined outbound message 304 may be sent by the server system to a source communication address of the customer initiated inbound message 302 as though originating from a destination communication address of the user or device receiving the customer initiated inbound message 302. "Communication address" refers to an electronic address of a device from which messages are sent or at which messages are received. Examples of communication addresses are phone numbers, MAC addresses, email addresses, and so on. The server system may also cause the first contact pre-defined outbound message 304 to appear on a display of the device that received the customer initiated inbound message 302 as though the first contact pre-defined outbound message 304 were sent from that device, so as to maintain the communication thread display on that device. In one embodiment, the server may interact with an app or application on the device receiving the customer initiated inbound message 302 to cause the app or application to send the first contact pre-defined outbound message 304 and thus achieve these results.

The disclosed system may take different actions depending on the time of day at which the customer initiated inbound message 302 is received. For example, if the customer initiated inbound message 302 is received during pre-defined office hours that may be configured within the system, a during office hours autoreply 306 may be sent in addition to the first contact pre-defined outbound message 304. A different message (not shown) may be sent if a customer initiated inbound message 302 is received outside of office hours, during a company holiday, corresponding to a particular recipient's out of office status, or other configurable parameters.

The first contact pre-defined outbound message 304 may be configured to be resent if contact with the particular customer is not maintained or reestablished over a configured interval. For example, if a customer does not make contact through the system for a configured interval of six months, that customer's information may be reconfigured such that a future inbound message may be treated as first contact.

Figure 4:
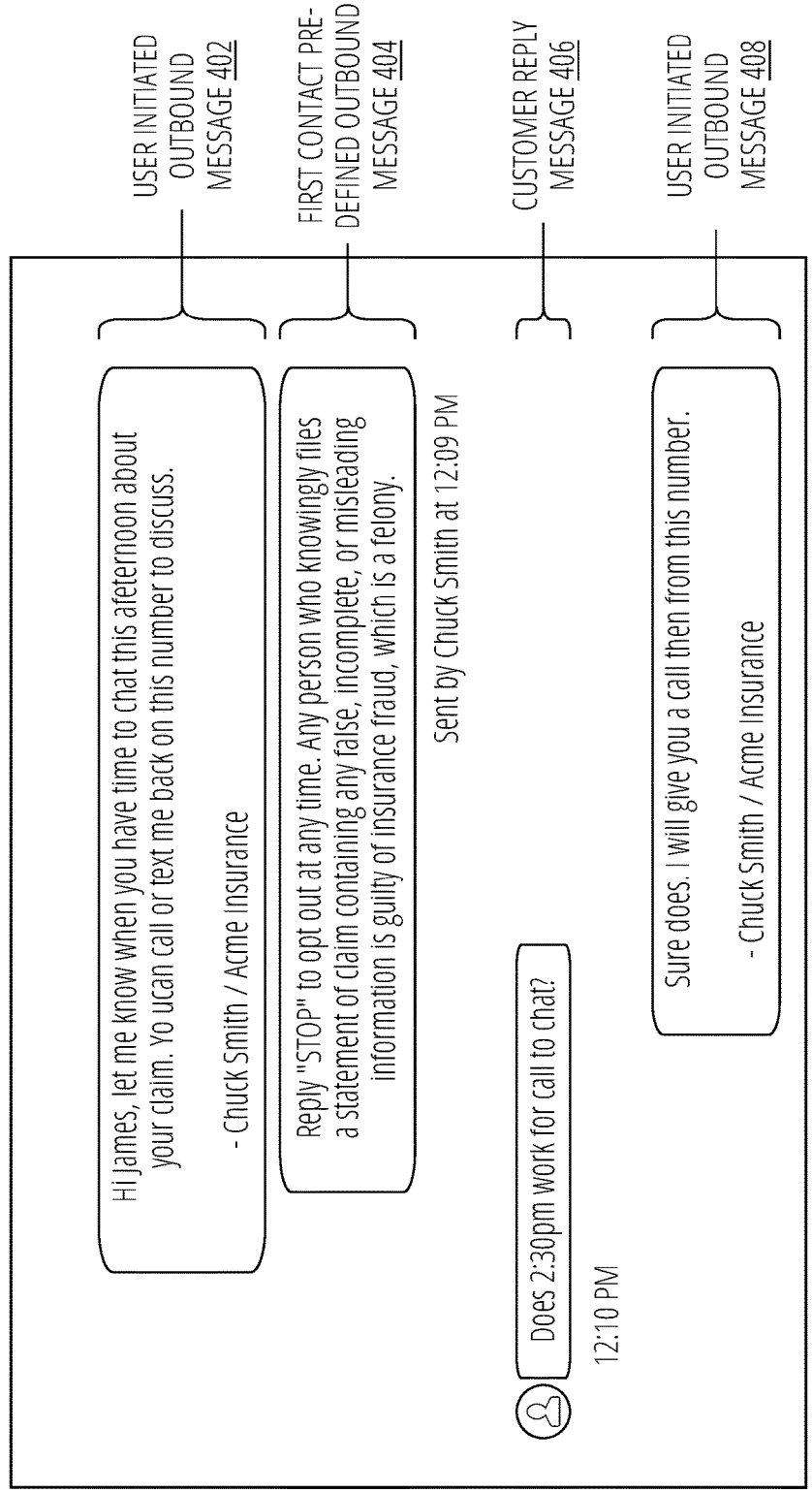
FIG. 4 depicts a communication sequence 400 in accordance with one embodiment.

FIG. 4 depicts a communication sequence 400 in accordance with one embodiment. The communication sequence 400 comprises a user initiated outbound message 402, a first contact pre-defined outbound message 404, a customer reply message 406, and a user initiated outbound message 408.

The system detects when a user initiated outbound message 402 is sent to a customer and is the first instance of contact (overall, or in a configured interval) with that customer through the system. When such a message comprises the first contact with that customer, a first contact pre-defined outbound message 404 may be sent, similar to the first contact pre-defined outbound message 304 introduced in FIG. 3. This first contact pre-defined outbound message 404 may be the same as the first contact pre-defined outbound message 304, or may differ as needed based on the context of being triggered by the user initiated outbound message 402 rather than the customer initiated inbound message 302.

The first contact pre-defined outbound message 404 may be generated by a server system intermediating communication between the source and destination devices of the messages. The first contact pre-defined outbound message 404 may be sent by the server system to a destination communication address for the user initiated outbound message 402 as though originating from a source communication address of the user or device sending the customer initiated inbound message 302. The server system may also cause the first contact pre-defined outbound message 404 to appear on a display of the device that sent the user initiated outbound message 402 as though the first contact pre-defined outbound message 404 were sent from that device, so as to maintain the communication thread display on that device. In one embodiment, the server may interact with an app or application on the device sending the user initiated outbound message 402 to cause the app or application to send the first contact pre-defined outbound message 404 and thus achieve these results.

The customer may subsequently send a customer reply message 406 through the disclosed system. This may be the customer's first inbound message detected in the system, but because the first contact was outbound and the first contact pre-defined outbound message 404 has already been transmitted, the customer's first inbound message may not trigger the sending of the first contact pre-defined outbound message 404. Thus the triggering of the first contact pre-defined outbound message 304 in response to the network 1220 may be conditioned further on whether or not said message was already sent as a first contact pre-defined outbound message 404 in response to a first outbound message. The system may continue to transmit messages such as the user initiated outbound message 408, without transmission of other autoreply messages, or may transmit appropriate autoreply messages (not shown) as configured.

The first contact pre-defined outbound message 404 may be configured to be resent if contact with the particular customer is not maintained or reestablished over a configured interval. For example, if a customer is not contacted through the system for a configured interval of six months, that customer's information may be reconfigured such that a future outbound message may be treated as first contact.

Figure 5:
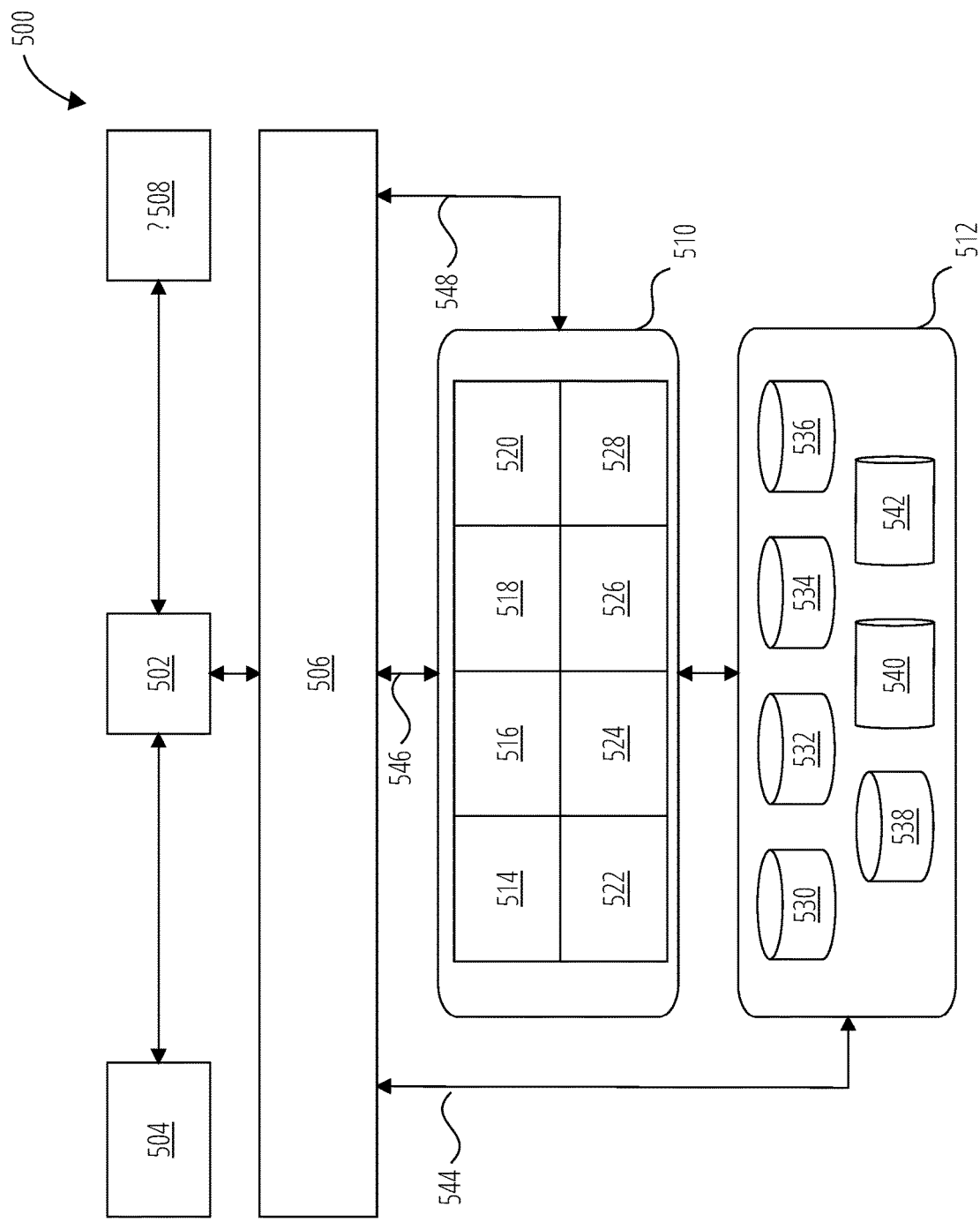
FIG. 5 depicts a communication system 500 in accordance with one embodiment.

FIG. 5 depicts a communication system 500 in accordance with one embodiment. The communication system 500 may comprise logical and hardware components that interact to provide the disclosed functionality. The communication system 500 may comprise a load balancer 502, a browser extension 504, API services 506, an application frontend 508, services 510, and databases 512.

Services 510 may comprise a settings service 514, an autoreply service 516, a template service 518, a user service 520, an ID server 522, a migration tool 524, a custom message service 526, and a search service 528. Databases 512 may include Elasticsearch 530, Aurora MySQL 532, Couchbase 534, MongoDB 536, MogileFS 538, or other database structures, as well as messaging/streaming platforms such as ActiveMQ 540 or Kafka 542. These services 510 and databases 512 are presented as common examples in the industry. One of skill in the art will recognize that these services 510 and databases 512 are not intended to limit the scope of the disclosed system.

The load balancer 502 acts to manage requests from the browser extension 504 and application frontend 508 to the API services 506, as well as responses from the API services 506 to the browser extension 504 and application frontend 508.

The browser extension 504 and application frontend 508 may provide conduits from custom or industry standard user interfaces through which messages from customers, potential customers, and business users may enter the system. The load balancer 502 may transmit these messages to the API services 506 such that the API services 506 may generate the appropriate access, query, or other commands for the various interactions 546 appropriate to the incoming messages.

The API services 506 may direct the various interactions 546 with the services 510. The API services 506 may additionally facilitate direct access 544 to the databases 512 independent of action by the services 510. The API services 506 may also use an API backend 548 to communicate with services 510 as needed.

The settings service 514 may manage settings such as configured intervals, first contact trigger states, and conditions under which the autoreply service 516 may send specific autoreply messages under the disclosed methods and system.

The autoreply service 516 may manage pre-configured autoreply messages to be transmitted under the disclosed methods and systems. The autoreply service 516 may interact with the settings service 514 to determine which messages may be sent under specific conditions.

The template service 518 may provide default templates for first contact messages. A business may customize these templates as needed through interaction with the template service 518.

The user service 520 may provide specific information based on the user initiating interaction through the browser extension 504 and application frontend 508.

The ID server 522 may manage identifying information for customers and business users that have accessed and sent messages through the system. Information may include names, company identification credentials, company affiliations, contact information, and other parameters used to identify and manage permissions and configuration settings for specific individuals using the system.

The migration tool 524 may facilitate migration from a particular database or platform to another, as needed based on business needs, system upgrades, etc.

The custom message service 526 may allow a business to customize language in their first contact messages, autoreply messages, or other standardized messaging they send to customers through the disclosed system. The search service 528 may allow a business to search through information stored in the databases 512.

The databases 512 may store configured first contact and autoreply message text files. The databases 512 may store business configuration parameters, information or parameters specific to individual business users, data on customers or prospective customers who have made contact via a text enabled line, message templates, archives of incoming and outgoing messages processed by the disclosed system, etc. The following paragraphs describe a non-limiting set of commercially available databases 512 and streaming/messaging platforms that may be used in implementing the disclosed methods and system.

Elasticsearch 530 is a well-known enterprise-level search engine based on the Lucene library. It provides a distributed, multitenant-capable full-text search engine with an HTTP web interface and schema-free JSON documents. Aurora MySQL 532 is a database technology currently provided by Amazon® Corp.

Couchbase 534 is an open-source, distributed multi-model NoSQL document-oriented database software package for interactive applications. These applications may serve many concurrent users by creating, storing, retrieving, aggregating, manipulating and presenting data. MongoDB 536 is a cross-platform document-oriented database program. Classified as a NoSQL database program, MongoDB uses JSON-like documents with optional schemas. MogileFS 538 is an open source distributed file system provided by Google® Corp.

ActiveMQ 540 is an open source message broker developed by the Apache Software Foundation written in Java together with a full Java Message Service (JMS) client. Supported clients include Java via JMS 1.1 as well as several other "cross language" clients. The communication is managed with features such as computer clustering and ability to use any database as a JMS persistence provider besides virtual memory, cache, and journal persistency.

Kafka 542 is an open-source stream-processing software platform developed by the Apache Software Foundation, written in Scala and Java. Kafka provides a unified, high-throughput, low-latency platform for handling real-time data feeds. Kafka can connect to external systems for data import/export and provides a Java stream processing library. Kafka uses a binary TCP-based protocol and a message set abstraction that groups messages together to reduce the overhead of the network roundtrip.

The communication system 500 may detect an inbound message for example at the API backend 548, which may extract a source communication address (the address of the sender of the message) from the inbound message, for example by invoking the user service 520. The communication system 500 may invoke the search service 528 and settings service 514 to compare the source communication address against a dynamic set of communication addresses accumulated in one or more of the databases 512 in a time configured interval, and on condition that the source communication address is not in the dynamic set, add the source communication address to the dynamic set, and invoke the autoreply service 516 to send a pre-defined outbound message (e.g., one specifically configured for the source address, and/or specific keywords in the inbound message, etc.) to the source communication address. The pre-defined outbound message may be determined by invoking the template service 518 and may be pre-configured in the system using the custom message service 526. The autoreply service 516 may assign a higher outbound priority to the pre-defined outbound message over any configured autoreply generally, or any autoreply specifically for the source communication address or keywords of the inbound message specifically, such that the pre-defined outbound message is sent to the source communication address immediately preceding any such other configured autoreply.

The communication system 500 thus maintains a set of source communication addresses over a configured time interval. Source communication addresses for inbound messages received outside the configured interval may be removed from the set, thus resetting the triggering of the pre-defined outbound message for new messages received from the source communication address. Example time intervals are days, weeks, or months. Changes to the pre-defined outbound message, e.g., using the template service 518, may also trigger removal of source communication addresses from the set, (e.g., those destination communication addresses associated with the changed pre-defined outbound message).

The communication system 500 may also detect an outbound message for example at the API backend 548, which may identify a destination communication address for the outbound message, for example by invoking the user service 520. The communication system 500 may API services 506 may utilize the search service 528 and settings service 514 to compare the destination communication address against a dynamic set of communication addresses accumulated in one or more of the databases 512 in a time configured interval, and on condition that the destination communication address is not in the dynamic set, add the destination communication address to the dynamic set, and template service 518 to locate a pre-defined outbound message (e.g., one specifically configured for the destination communication address, and/or specific keywords in the outbound message, etc.), and communicate the pre-defined outbound message to the destination communication address. The pre-defined outbound message may be determined by invoking the template service 518 and may be pre-configured in the system using the custom message service 526. The API services 506 may arrange the priority of the outbound message and the pre-defined outbound message so that the pre-defined outbound message is sent to the destination communication address immediately after the outbound message.

The communication system 500 thus also maintains a set of destination communication addresses over a configured time interval. Destination addresses for outbound messages sent outside the configured interval may be removed from the set, thus resetting the triggering of the pre-defined outbound message for new outbound messages to the destination communication address. Example time intervals are days, weeks, or months. Changes to the pre-defined outbound message, e.g., using the template service 518, may also trigger removal of destination communication addresses from the set (e.g., those destination communication addresses associated with the changed pre-defined outbound message).

Figure 6:
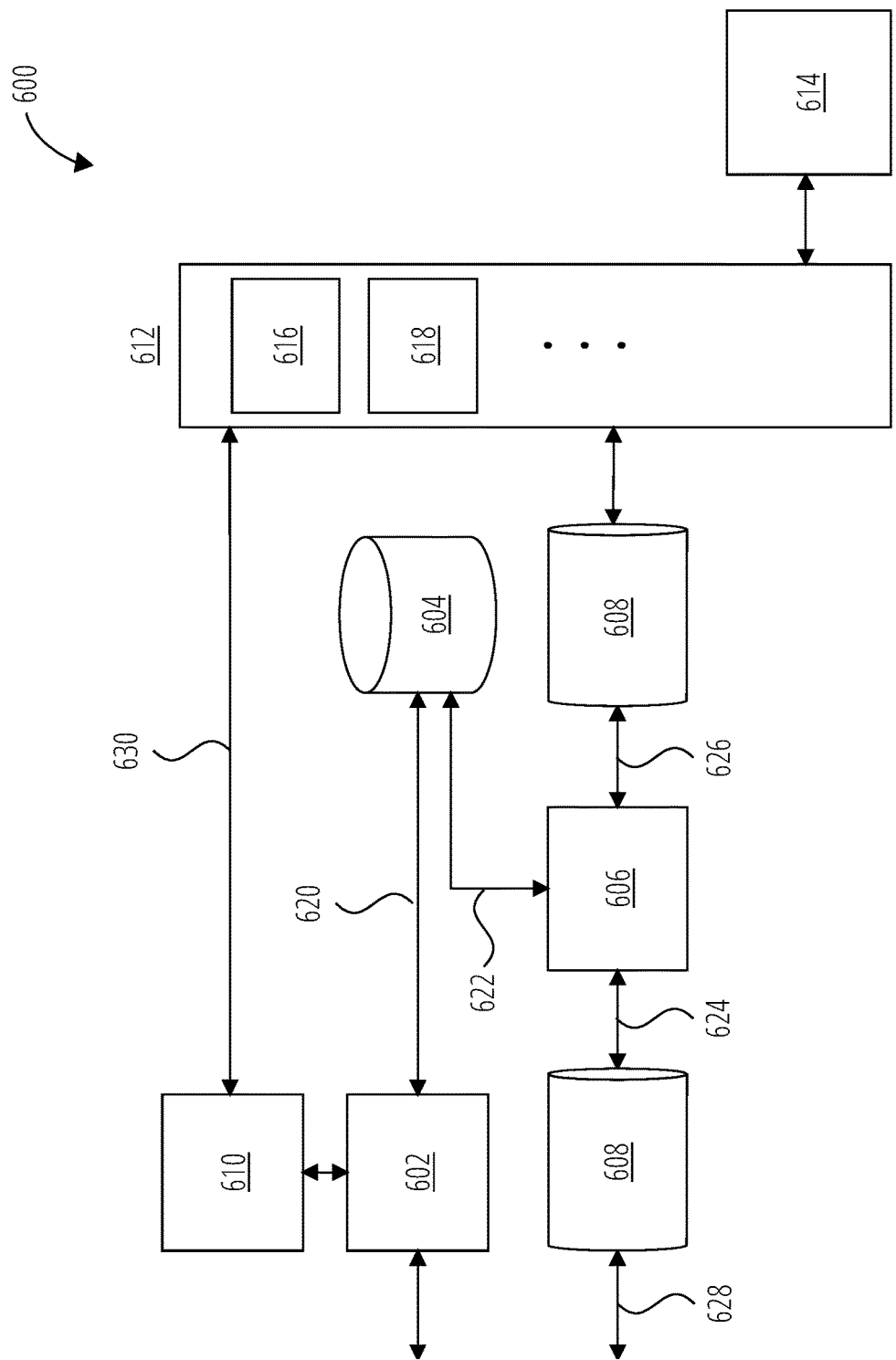
FIG. 6 depicts a communication system 600 in accordance with one embodiment.

FIG. 6 depicts a communication system 600 in accordance with one embodiment. The communication system 600 illustrated may provide integration functionality for the communication system 500 introduced in FIG. 5 that allows the communication system 500 to be integrated with third party systems in the industry for the purposes of platform migration and upgrades, as will be understood by one skilled in the art.

The communication system 600 comprises a controller 602, a gateway 610, a database 604, a hub 606, a messaging/streaming platform 608, a third party applications 612, and a third party API 614. The third party applications 612 may comprise customer relationship management applications (e.g., a CRM 1 616 and a CRM 2 618), and other logic.

The controller 602 may be one or more processors or processing modules configured to perform or coordinate the performance of the functions needed to migrate or upgrade the system implementing the disclosed methods. The controller 602 may send persistent configuration 620 information to a database 604 in order to store configuration parameters intended to persist once the platform migration or upgrade is complete.

The database 604 may store configuration data, archives, and other information during the migration or upgrade. The database 604 may access 3rd party data management 622 through interaction with the hub 606.

The hub 606 may enable fetching of line or account configurations 624 by interfacing with the messaging/streaming platform 608 as the messaging/streaming platform 608 manages events 628 such as inbound message, outbound messages, contact add/update line events, and other actions. The hub 606 may also interact with the messaging/streaming platform 608 via configuration based routing 626 in order to communicate with the third party applications 612.

The gateway 610 may interact with the controller 602 managing the migration and upgrade activity. The gateway 610 may connect to a third party API 630 available through third party applications 612.

Third party applications 612 may interact with the gateway 610 and the third party API 614. The third party applications 612 may enable the gateway 610 to connect to a third party API 630 during migration and upgrade activities.

Figure 7:
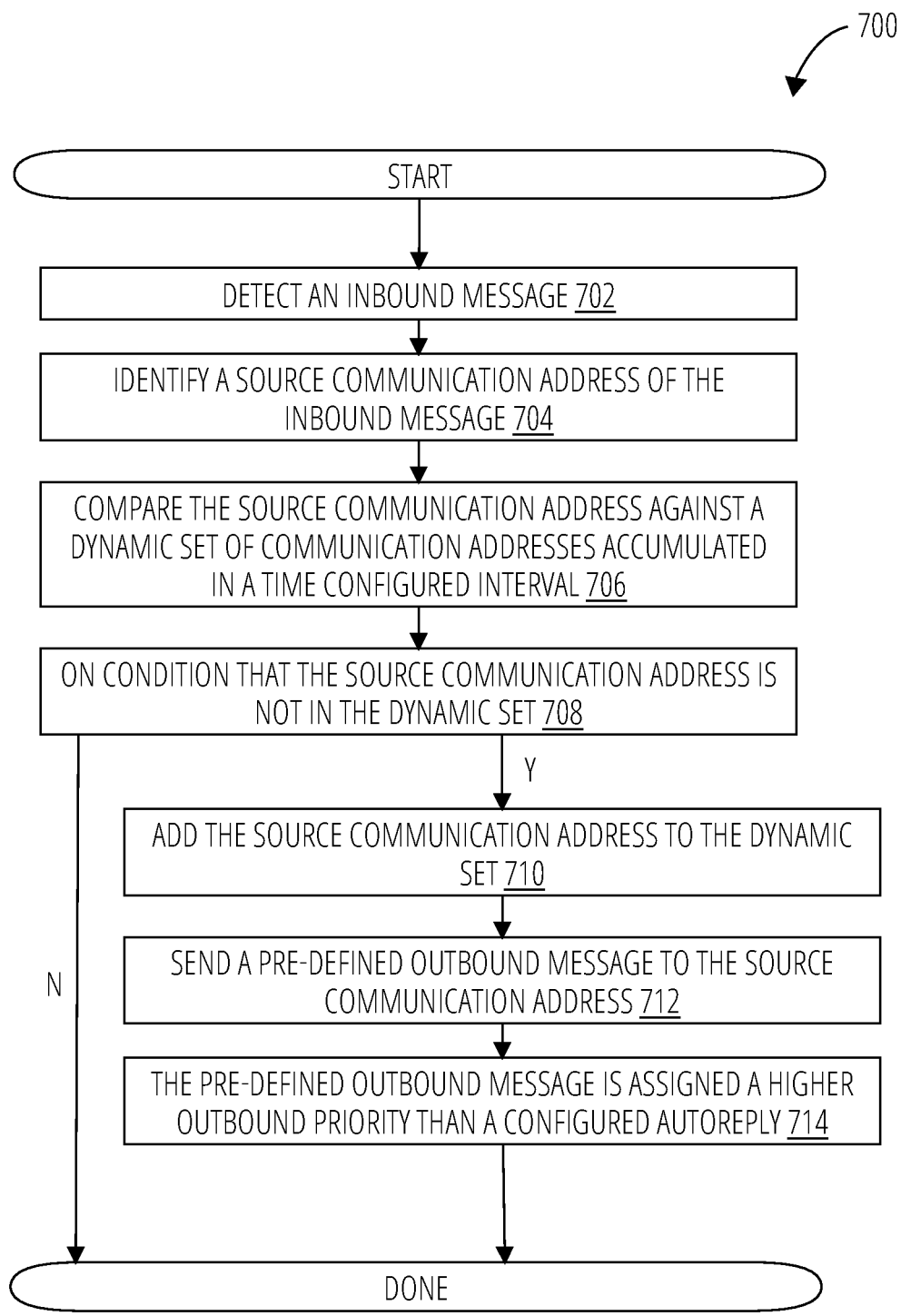
FIG. 7 depicts a communication process 700 in accordance with one embodiment.

Referring now to the communication process 700 depicted in FIG. 7, at block 702, communication process 700 detects an inbound message. In block 704, communication process 700 identifies a source communication address for the inbound message. In block 706, communication process 700 compares the source communication address against a dynamic set of communication addresses accumulated in a time configured interval. In block 708, communication process 700 tests for the condition that the inbound communication address is not in the dynamic set. If the condition is met, in block 710, communication process 700 adds the source communication address to the dynamic set and sends a pre-defined outbound message to the source communication address at block 712. The pre-defined outbound message is assigned a higher outbound priority than a configured autoreply generally, or an autoreply configured for the source communication address specifically (block 714).

Figure 8:
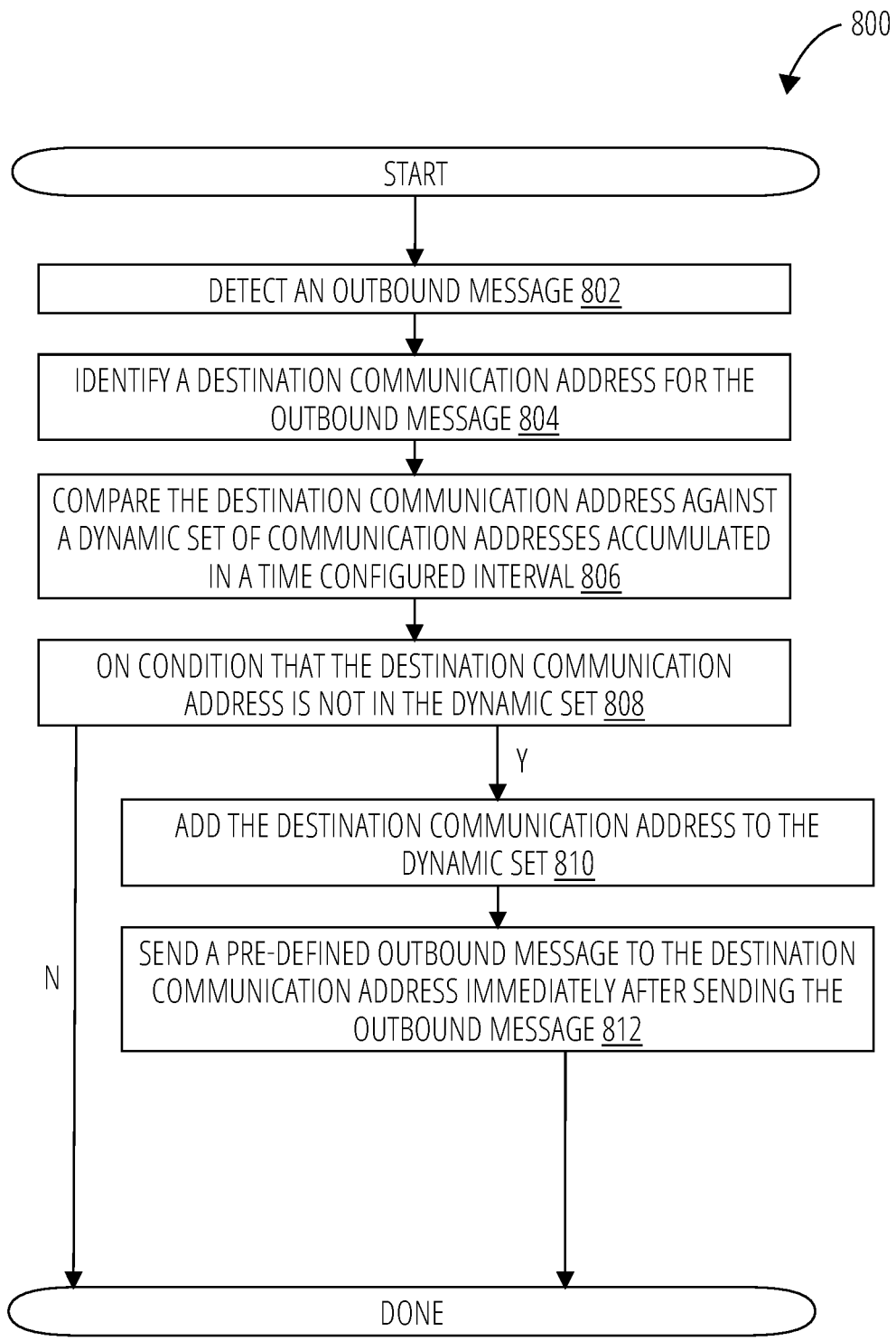
FIG. 8 depicts a communication process 800 in accordance with one embodiment.

Referring now to FIG. 8, at block 802, communication process 800 detects an outbound message. In block 804, communication process 800 identifies a destination communication address for the outbound message. In block 806, communication process 800 compares the destination communication address against a dynamic set of communication addresses accumulated in a time configured interval. In block 808, on condition that the destination communication address is not in the dynamic set, communication process 800 adds the destination communication address to the dynamic set (block 810) and sends a pre-defined outbound message to the destination communication address (block 812).

Figure 9:
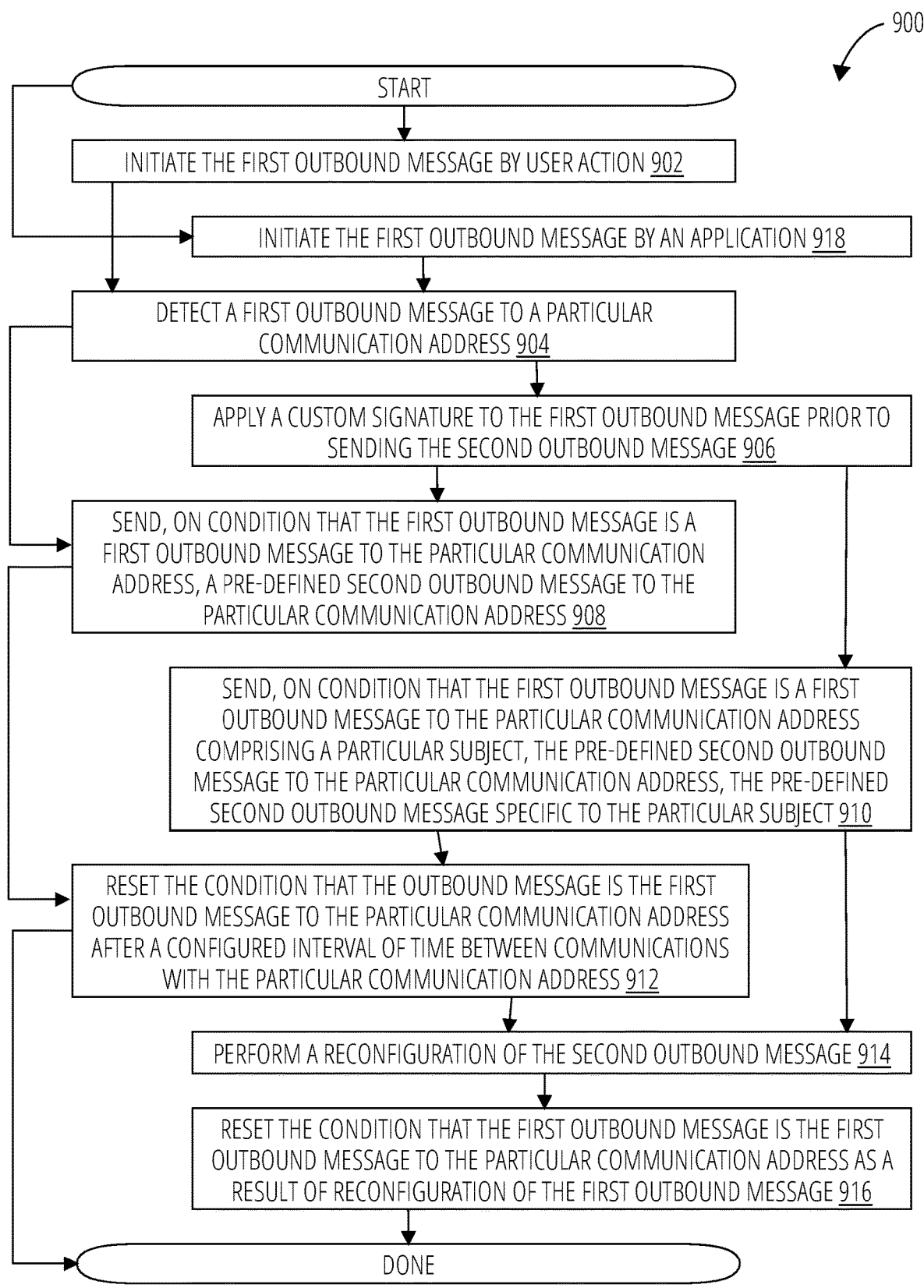
FIG. 9 depicts a communication process 900 in accordance with one embodiment.

FIG. 9 depicts a communication process 900 in accordance with one embodiment. The communication process 900 may be initiated by either a first outbound message to a particular customer, whether initiated by user action at block 902 or by an application at block 918. This communication process 900 may involve an exchange such as that illustrated in FIG. 4 communication sequence 400.

In block 904, a first outbound message to a particular communication address may be detected. This may be the first outbound message initiated in either block 902 or block 918. In one embodiment, a custom signature configured for the sender of the first outbound message may be applied in block 906 before a second outbound message is sent in block 908. For example, if a business user's name and title is configured to be appended as a signature to first outbound messages from a particular user to a particular customer, this information may be so appended at this block 906. If no custom signature is configured, block 904 may proceed directly to block 908.

At block 908, if the first outbound message is the first outbound message to the particular communication address, a pre-defined second outbound message may be sent to the particular communication address. For example, if a pre-configured regulatory compliance message has been identified to accompany first contact communication with new customers, a message containing this verbiage may be configured to be sent as a second outbound message immediately after the first outbound message is sent.

In block 910, on condition that the first outbound message is a first outbound message to the particular communication address comprising a particular subject, a pre-defined second outbound message specific to the particular subject may be sent to that communication address. "Subject" refers to any word or phrase, or sentiment or topic derived from the content of a message or the subject line of a message. For example, if the first outbound message requests that a customer complete a particular form for initial intake, a pre-defined outbound message containing a link to that form may be configured to be sent if the first outbound message references the form number. Another example is a change to terms of service or disclaimer information for communications for certain subject matter, such as financial or legal advice. From block 910, the communication process 900 may proceed to block 912 or block 914 as appropriate.

Upon completion of block 908 or block 910, the communication process 900 may proceed to block 912. In block 912, the condition that the outbound message is the first outbound message to the particular communication address may be reset after a configured interval of time between communications with the particular communication address. For example, if no communication with that communication address occurs within three months, at the end of those three months, the reset of block 912 may be performed, and the next communication to or from that communication address may be treated as a first contact. If appropriate, the communication process 900 may complete after block 912.

In block 914, a reconfiguration of the second outbound message may be performed. Following the example above, a change in the intake form or disclaimers. The pre-defined outbound message specifically sent when mention of an intake form is made, or updated disclaimer language, may then need to be resent to clients after some configured interval following their initial contact.

In block 916, the condition that the first outbound message is the first outbound message to the particular communication address may be reset as a result of reconfiguration of the first outbound message. If block 914 and block 916 are not appropriate to the communication process 900 in a particular use case, the communication process 900 may complete after block 912. Otherwise, the communication process 900 may be considered complete after block 916.

Figure 10:
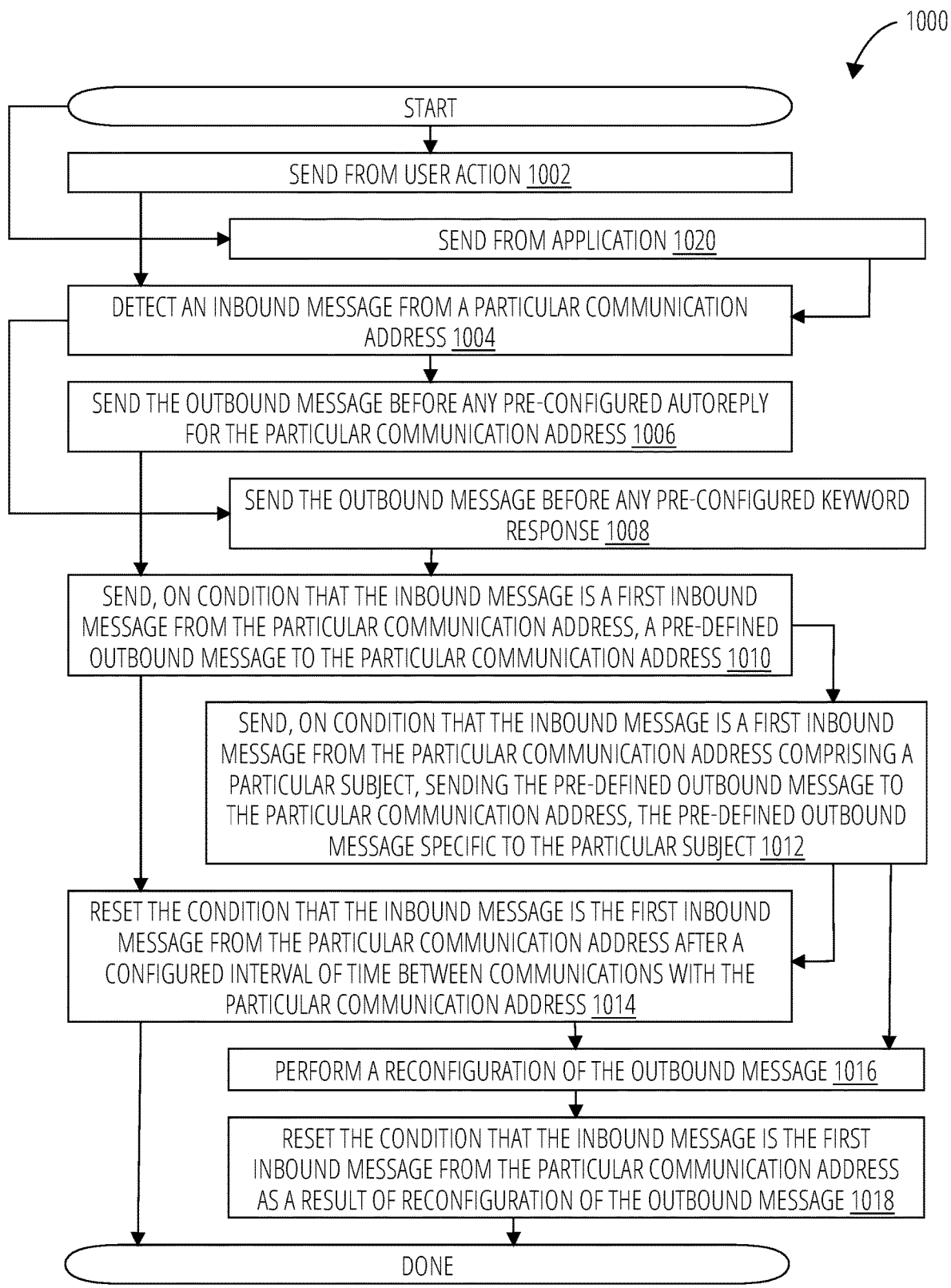
FIG. 10 depicts a communication process 1000 in accordance with one embodiment.

FIG. 10 depicts a communication process 1000 in accordance with one embodiment. The communication process 1000 may start with either block 1002, where an inbound message is sent from user action, or block 1020, where the inbound message is sent from an application. This communication process 1000 may involve an exchange such as that illustrated in FIG. 3 communication sequence 300.

In block 1004, an inbound message from a particular communication address may be detected. Before any pre-configured autoreply for the particular communication address is sent (block 1006), and before any pre-configured keyword response is sent (block 1008), the outbound message may be sent.

In block 1010, on condition that the inbound message is a first inbound message from the particular communication address, a pre-defined outbound message may be sent to the particular communication address. This pre-defined outbound message may include compliance language stipulated for interaction with representatives of the business contacted, opt out information, etc. The communication process 1000 may from block 1010 proceed to block 1012 or block 1014.

In block 1012, on condition that the inbound message is a first inbound message from the particular communication address comprising a particular subject, a pre-defined outbound message may be sent to the particular communication address. This pre-defined outbound message may be specific to the particular subject. The communication process 1000 may proceed to block 1014 or block 1016 as appropriate.

In block 1014, the condition that the inbound message is the first inbound message from the particular communication address may be reset after a configured interval of time between communications with the particular communication address. For example, if no communication occurs with the particular communication address within an interval of three months, the first inbound message condition may be reset, such that a message to or from that communication address after the three month period may be treated as a first contact. The communication process 1000 may proceed to block 1016 if appropriate or may conclude after block 1014.

In block 1016, the outbound message may be reconfigured. For example, disclosure the business makes for regulatory compliance at initial contact may change, causing a change in the outbound message communicating that disclosure.

In block 1018, the condition that the inbound message is the first inbound message from the particular communication address may be reset as a result of reconfiguration of the outbound message. In this manner, even customers with previous communications in progress within the configured interval may be sent an updated compliance message upon the next message to or from their communication address. The communication process 1000 may be considered complete after block 1018.

Software Implementations

The systems disclosed herein, or particular components thereof, may in some embodiments be implemented as software comprising instructions executed on one or more programmable device. By way of example, components of the disclosed systems may be implemented as an application, an app, drivers, and services. Components of the system may be implemented as services that execute as one or more processes, modules, subroutines, or tasks on a server device so as to provide the described capabilities to one or more client devices over a combination of the Internet and carrier networks. The system may also include one or more app or applications on a mobile device and/or a laptop, desktop, or tablet computer.

Figure 11:
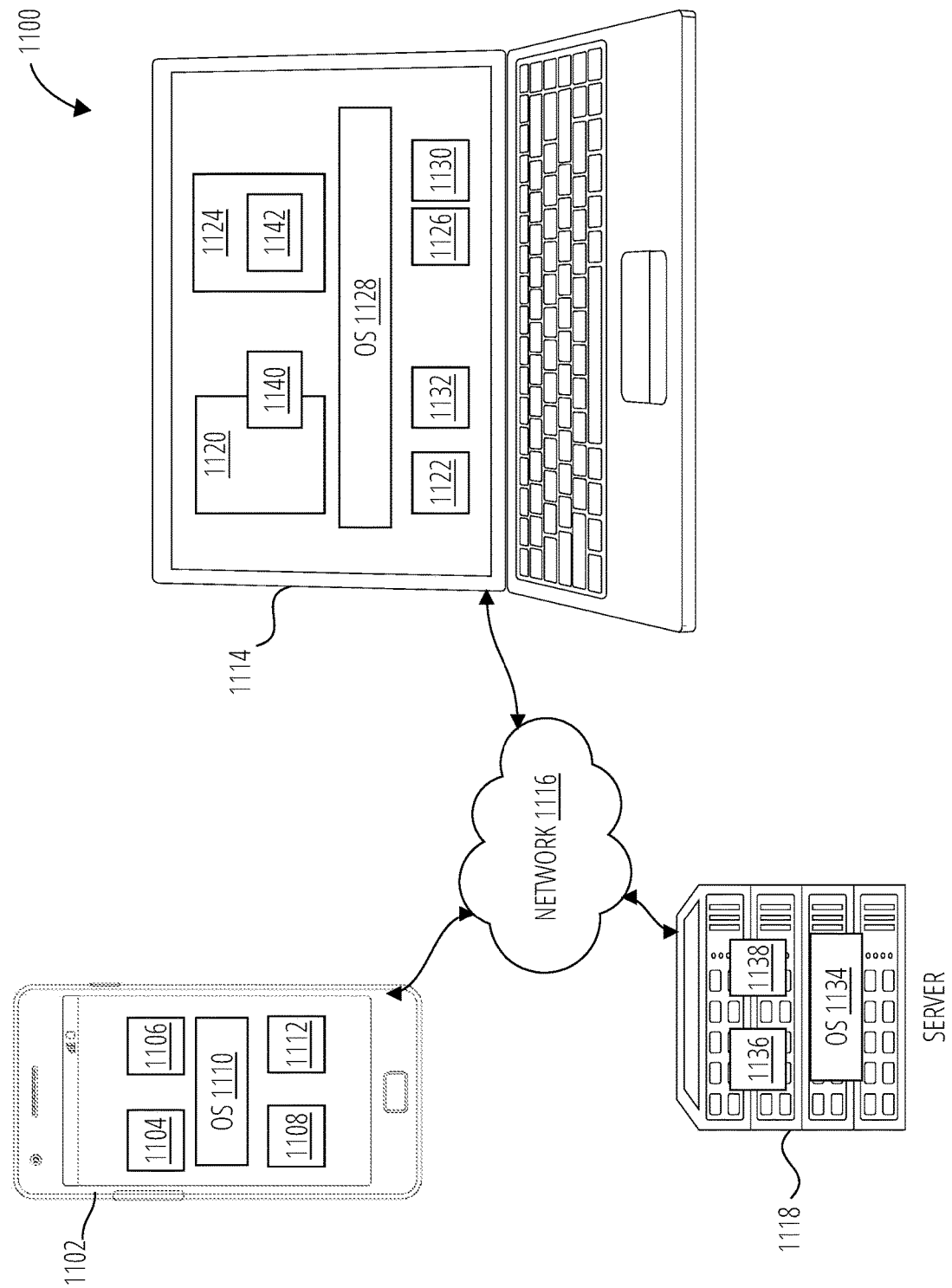
FIG. 11 depicts a networked machine configuration 1100 in accordance with one embodiment.

Referring to FIG. 11, a networked machine configuration 1100 depicts various computer hardware devices and software modules coupled by a network 1116 in one embodiment. Each device includes a native operating system, typically pre-installed on its non-volatile RAM, and a variety of software applications or apps for performing various functions.

The mobile programmable device 1102 comprises a native operating system 1110 and various apps (e.g., app 1104 and app 1106). A computer 1114 also includes an operating system 1128 that may include one or more library of native routines to run executable software on that device. The computer 1114 also includes various executable applications (e.g., application 1120 and application 1124). The mobile programmable device 1102 and computer 1114 are configured as clients on the network 1116. A server 1118 is also provided and includes an operating system 1134 with native routines specific to providing a service (e.g., service 1138 and service 1136) available to the networked clients in this configuration.

In one embodiment, an app or application on a mobile device such as a cell phone may be utilized for sending outbound messages and receiving inbound messages that are processed by services of a network server to implement one or more of communication process 700, communication process 800, communication process 900, and communication process 1000.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the computer 1114, mobile programmable device 1102, and/or server 1118. Any of these devices may employ a loader to place the executable and any associated library in memory for execution. The operating system executes the program by passing control to the loaded program code, creating a task or process. An alternate means of executing an application or app involves the use of an interpreter (e.g., interpreter 1142).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 1108 or driver 1112 on the mobile programmable device 1102 or computer 1114 (e.g., driver 1122 and driver 1132) might enable wireless headphones to be used for audio output(s) and a camera to be used for video inputs. Any of the devices may read and write data from and to files (e.g., file 1126 or file 1130) and applications or apps may utilize one or more plug-in (e.g., plug-in 1140) to extend their capabilities (e.g., to encode or decode video files).

The network 1116 in the networked machine configuration 1100 can be of a type understood by those skilled in the art, including a Local Area Network (LAN), Wide Area Network (WAN), Transmission Communication Protocol/Internet Protocol (TCP/IP) network, and so forth. These protocols used by the network 1116 dictate the mechanisms by which data is exchanged between devices.

Machine Embodiments

Figure 12:
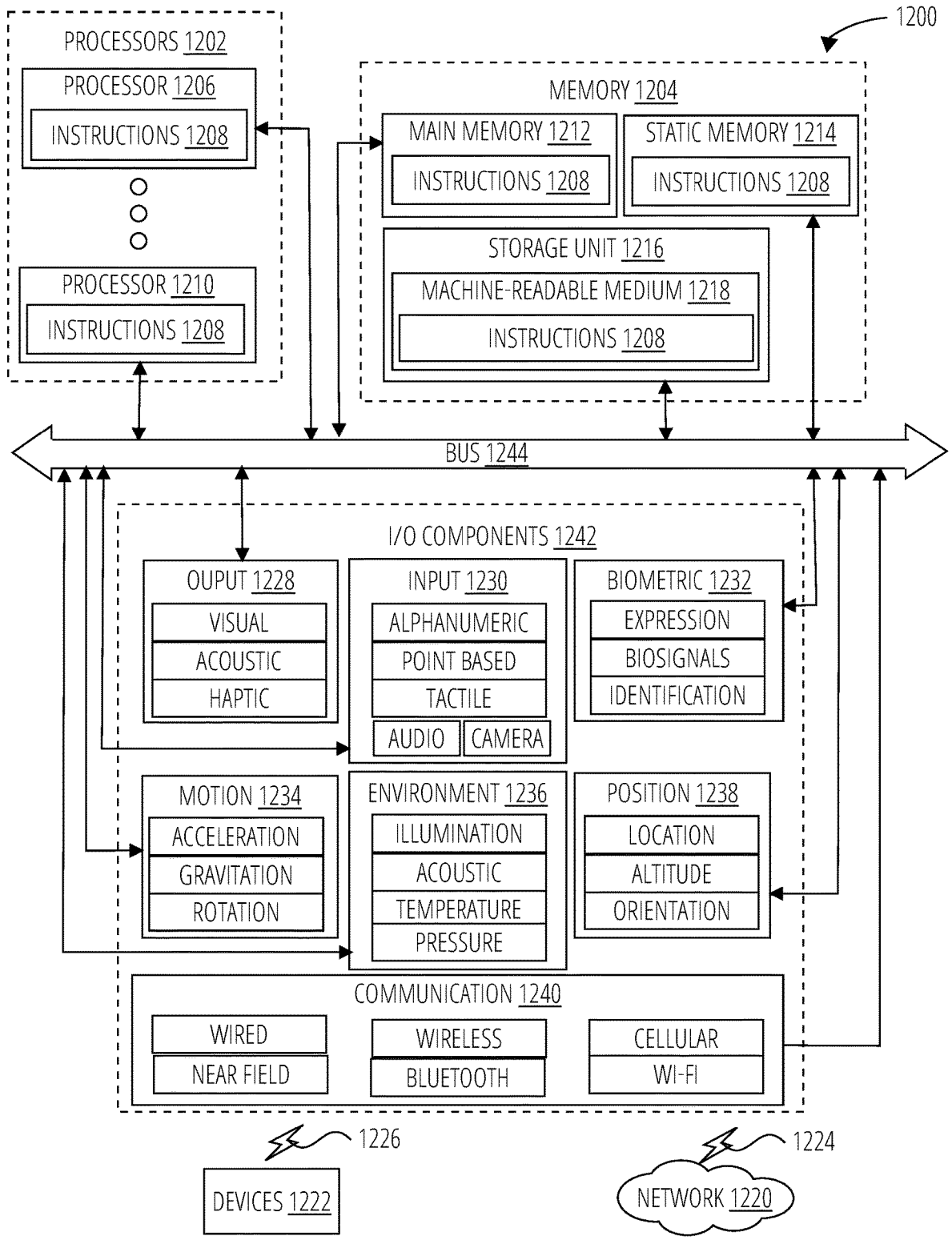
FIG. 12 depicts a diagrammatic representation of a computer system 1200 within which a set of instructions may be executed for causing the machine to perform any one or more of the methodologies discussed herein, according to an example embodiment.

FIG. 12 depicts a diagrammatic representation of a computer system 1200 in the form of a computer system within which logic may be implemented to cause the machine to perform any one or more of the methodologies disclosed herein, according to an example embodiment.

Specifically, FIG. 12 depicts a computer system 1200 comprising instructions 1208 (e.g., a program, an application, an applet, an app, or other executable code) for causing the computer system 1200 to perform any one or more of the functions or methods discussed herein. For example the instructions 1208 may cause the computer system 1200 to carry out one or more of communication process 700, communication process 800, communication process 900, and communication process 1000. The instructions 1208 configure a general, non-programmed machine into a particular computer system 1200 programmed to carry out said functions and/or methods.

In alternative embodiments, the computer system 1200 operates as a standalone device or may be coupled (e.g., networked) to other machines. In a networked deployment, the computer system 1200 may operate in the capacity of a server machine or a client machine in a server-client network environment, or as a peer machine in a peer-to-peer (or distributed) network environment. The computer system 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the computer system 1200. Further, while only a single computer system 1200 is depicted, the term "machine" shall also be taken to include a collection of machines that individually or jointly execute the instructions 1208 to perform any one or more of the methodologies or subsets thereof discussed herein.

The computer system 1200 may include processors 1202, memory 1204, and I/O components 1242, which may be configured to communicate with each other such as via one or more bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1206 and processor 1210) to execute the instructions 1208. The term "processor" is intended to include multi-core processors that may comprise two or more independent processors (sometimes referred to as "cores") that may execute instructions contemporaneously. Although FIG. 12 depicts multiple processors 1202, the computer system 1200 may include a single processor with a single core, a single processor with multiple cores (e.g., a multi-core processor), multiple processors with a single core, multiple processors with multiples cores, or any combination thereof.

The memory 1204 may include one or more of a main memory 1212, a static memory 1214, and a storage unit 1216, each accessible to the processors 1202 such as via the bus 1244. The main memory 1212, the static memory 1214, and storage unit 1216 may be utilized, individually or in combination, to store the instructions 1208 embodying any one or more of the functionality described herein. The instructions 1208 may reside, completely or partially, within the main memory 1212, within the static memory 1214, within a machine-readable medium 1218 within the storage unit 1216, within at least one of the processors 1202 (e.g., within the processor's cache memory), or any suitable combination thereof, during execution thereof by the computer system 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones will likely include a touch input device or other such input mechanisms, while a headless server machine will likely not include such a touch input device. It will be appreciated that the I/O components 1242 may include many other components that are not shown in FIG. 12. The I/O components 1242 are grouped according to functionality merely for simplifying the following discussion and the grouping is in no way limiting. In various example embodiments, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1242 may include biometric components 1232, motion components 1234, environmental components 1236, or position components 1238, among a wide array of possibilities. For example, the biometric components 1232 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 may include communication components 1240 operable to couple the computer system 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 1204, main memory 1212, static memory 1214, and/or memory of the processors 1202) and/or storage unit 1216 may store one or more sets of instructions and data structures (e.g., software) embodying or utilized by any one or more of the methodologies or functions described herein. These instructions (e.g., the instructions 1208), when executed by processors 1202, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Communication Network Embodiments

In various example embodiments, one or more portions of the network 1220 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1220 or a portion of the network 1220 may include a wireless or cellular network, and the coupling 1224 may be a Code Division Multiple Access (CDMA) connection, a Global System for Mobile communications (GSM) connection, or another type of cellular or wireless coupling. In this example, the coupling 1224 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1208 and/or data generated by or received and processed by the instructions 1208 may be transmitted or received over the network 1220 using a transmission medium via a network interface device (e.g., a network interface component included in the communication components 1240) and utilizing any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1208 for execution by the computer system 1200, and/or data generated by execution of the instructions 1208, and/or data to be operated on during execution of the instructions 1208, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

- 100 communication server system
- 102 message header parser
- 104 tracking database
- 106 control logic
- 108 interval timer
- 110 message generator
- 112 outbound queue
- 114 outbound message
- 116 autoreply outbound message
- 118 pre-defined outbound message
- 120 inbound message
- 122 app trigger to send pre-defined outbound message
- 202 source address communication interval table
- 204 destination address communication interval table
- 206 message table
- 300 communication sequence
- 302 customer initiated inbound message
- 304 first contact pre-defined outbound message
- 306 during office hours autoreply
- 400 communication sequence
- 402 user initiated outbound message
- 404 first contact pre-defined outbound message
- 406 customer reply message
- 408 user initiated outbound message
- 500 communication system
- 502 load balancer
- 504 browser extension
- 506 API services
- 508 application frontend
- 510 services
- 512 databases
- 514 settings service
- 516 autoreply service
- 518 template service
- 520 user service
- 522 ID server
- 524 migration tool
- 526 custom message service
- 528 search service
- 530 Elasticsearch
- 532 Aurora MySQL
- 534 Couchbase
- 536 MongoDB
- 538 MogileFS
- 540 ActiveMQ
- 542 Kafka
- 544 direct access
- 546 various interactions
- 548 API backend
- 600 communication system
- 602 controller
- 604 database
- 606 hub
- 608 messaging/streaming platform
- 610 gateway
- 612 third party applications
- 614 third party API
- 616 CRM 1
- 618 CRM 2
- 620 persistent configuration
- 622 access 3rd party data management
- 624 fetching of line or account configurations
- 626 configuration based routing
- 628 events
- 630 connect to a third party API
- 700 communication process
- 702 block
- 704 block
- 706 block
- 708 block
- 710 block
- 712 block
- 714 block
- 800 communication process
- 802 block
- 804 block
- 806 block
- 808 block
- 810 block
- 812 block
- 900 communication process
- 902 block
- 904 block
- 906 block
- 908 block
- 910 block
- 912 block
- 914 block
- 916 block
- 918 block 1000 communication process
1002 block
1004 block
1006 block
1008 block
1010 block
1012 block
1014 block
1016 block
1018 block
1020 block
1100 networked machine configuration
1102 mobile programmable device
1104 app
1106 app
1108 driver
1110 operating system
1112 driver
1114 computer
1116 network
1118 server
1120 application
1122 driver
1124 application
1126 file
1128 operating system
1130 file
1132 driver
1134 operating system
1136 service
1138 service
1140 plug-in
1142 interpreter
1200 computer system
1202 processors
1204 memory
1206 processor
1208 instructions
1210 processor
1212 main memory
1214 static memory
1216 storage unit
1218 machine-readable medium
1220 network
1222 devices
1224 coupling
1226 coupling
1228 output components
1230 input components
1232 biometric components
1234 motion components
1236 environmental components
1238 position components
1240 communication components
1242 I/O components
1244 bus Terminology "Algorithm" refers to any set of instructions configured to cause a machine to carry out a particular function or process.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported.

"Compiled computer code" refers to object code or executable code derived by executing a source code compiler and/or subsequent tools such as a linker or loader.

"Compiler" refers to logic that transforms source code from a high-level programming language into object code or in some cases, into executable code.

"Computer code" refers to any of source code, object code, or executable code.

"Computer code section" refers to one or more instructions.

"Computer program" refers to another term for 'application' or 'app'.

"Driver" refers to low-level logic, typically software, that controls components of a device. Drivers often control the interface between an operating system or application and input/output components or peripherals of a device, for example.

"Executable" refers to a file comprising executable code. If the executable code is not interpreted computer code, a loader is typically used to load the executable for execution by a programmable device.

"Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"File" refers to a unitary package for storing, retrieving, and communicating data and/or instructions. A file is distinguished from other types of packaging by having associated management metadata utilized by the operating system to identify, characterize, and access the file.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Interpreted computer code" refers to instructions in a form suitable for execution by an interpreter.

"Interpreter" refers to an interpreter is logic that directly executes instructions written in a source code scripting language, without requiring the instructions to a priori be compiled into machine language. An interpreter translates the instructions into another form, for example into machine language, or into calls to internal functions and/or calls to functions in other software modules.

"Library" refers to a collection of modules organized such that the functionality of all the modules may be included for use by software using references to the library in source code.

"Linker" refers to logic that inputs one or more object code files generated by a compiler or an assembler and combines them into a single executable, library, or other unified object code output. One implementation of a linker directs its output directly to machine memory as executable code (performing the function of a loader as well).

"Loader" refers to logic for loading programs and libraries. The loader is typically implemented by the operating system. A typical loader copies an executable into memory and prepares it for execution by performing certain transformations, such as on memory addresses.

"Machine language" refers to instructions in a form that is directly executable by a programmable device without further translation by a compiler, interpreter, or assembler. In digital devices, machine language instructions are typically sequences of ones and zeros.

"Module" refers to a computer code section having defined entry and exit points. Examples of modules are any software comprising an application program interface, drivers, libraries, functions, and subroutines.

"Object code" refers to the computer code output by a compiler or as an intermediate output of an interpreter. Object code often takes the form of machine language or an intermediate language such as register transfer language (RTL).

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Plug-in" refers to software that adds features to an existing computer program without rebuilding (e.g., changing or re-compiling) the computer program. Plug-ins are commonly used for example with Internet browser applications.

"Process" refers to software that is in the process of being executed on a device.

"Programmable device" refers to any logic (including hardware and software logic) who's operational behavior is configurable with instructions.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

"Source code" refers to a high-level textual computer language that requires either interpretation or compilation in order to be executed by a device.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Task" refers to one or more operations that a process performs.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
   detecting, on a computer server system, an outbound message from a source communication address for a first end user device of an entity user to a destination communication address of a second end user device of an end user; and
   responsive to determining that that the outbound message is a first outbound message from the source communication address:
      generating a pre-defined message comprising compliance language related to communications with the end user; and
      causing the pre-defined message to be sent to the destination communication address separately from and following the outbound message, the pre-defined message appearing to originate from the source communication address.

2. The method of claim 1, further comprising:
   responsive to determining that the first outbound message to the destination communication address comprises a particular keyword, configuring and sending to the destination communication address the pre-defined message that is specific to the particular keyword.

3. The method of claim 1, further comprising:
   storing a condition that the outbound message is the first outbound message from the source communication address; and
   resetting to the condition after a configured interval of time between communications from the source communication address.

4. The method of claim 3, further comprising:
   performing a reconfiguration of the pre-defined message; and
   resetting the condition that the outbound message is the first outbound message from the source communication address as a result of the reconfiguration of the pre-defined message.

5. The method of claim 1, wherein causing the pre-defined message to be sent to the destination communication address following the outbound message further comprises:
   causing the pre-defined message to be sent from an application of the first end user device.

6. The method of claim 1, further comprising:
   applying a custom signature to the first outbound message prior to sending the pre-defined message.

7. The method of claim 1, wherein the pre-defined message appears to originate from the source communication address immediately after the outbound message.

8. A computer server system comprising:
   at least one memory; and
   at least one processor, coupled to the memory, to perform operations comprising:
   detecting an outbound message from a source communication address for a first end user device of an entity user to a destination communication address of a second end user device of an end user; and
   responsive to determining that that the outbound message is a first outbound message from the source communication address:
      generating a pre-defined message comprising compliance language related to communications with the end user; and
      causing the pre-defined message to be sent to the destination communication address separately from and following the outbound message, the pre-defined message appearing to originate from the source communication address.

9. The computer server system of claim 8, the operations further comprising:
   responsive to determining that the first outbound message to the destination communication address comprises a particular keyword, configuring and sending to the destination communication address the pre-defined message that is specific to the particular keyword.

10. The computer server system of claim 8, the operations further comprising:
    storing a condition that the outbound message is the first outbound message from the source communication address; and
    resetting to the condition after a configured interval of time between communications from the source communication address.

11. The computer server system of claim 10, the operations further comprising:

performing a reconfiguration of the pre-defined message; and resetting the condition that the outbound message is the first outbound message from the source communication address as a result of the reconfiguration of the pre-defined message.

12. The computer server system of claim 8, wherein causing the pre-defined message to be sent to the destination communication address following the outbound message further comprises:

causing the pre-defined message to be sent from an application of the first end user device.

13. The computer server system of claim 8, the operations further comprising:

applying a custom signature to the first outbound message prior to sending the pre-defined message.

14. The computer server system of claim 8, wherein the pre-defined message appears to originate from the source communication address immediately after the outbound message.

15. A non-transitory computer-readable medium comprising instructions, which when performed by at least one processor of a computer server system cause the at least one processor to perform operations comprising:

detecting an outbound message from a source communication address for a first end user device of an entity user to a destination communication address of a second end user device of an end user; and responsive to determining that that the outbound message is a first outbound message from the source communication address:

generating a pre-defined message comprising compliance language related to communications with the end user; and causing the pre-defined message to be sent to the destination communication address separately from and following the outbound message, the pre-defined message appearing to originate from the source communication address.

16. The non-transitory computer-readable medium of claim 15, the operations further comprising:

responsive to determining that the first outbound message to the destination communication address comprises a particular keyword, configuring and sending to the destination communication address the pre-defined message that is specific to the particular keyword.

17. The non-transitory computer-readable medium of claim 15, the operations further comprising:

storing a condition that the outbound message is the first outbound message from the source communication address; and resetting to the condition after a configured interval of time between communications from the source communication address.

18. The non-transitory computer-readable medium of claim 17, the operations further comprising:

performing a reconfiguration of the pre-defined message; and resetting the condition that the outbound message is the first outbound message from the source communication address as a result of the reconfiguration of the pre-defined message.

19. The non-transitory computer-readable medium of claim 15, wherein causing the pre-defined message to be sent to the destination communication address following the outbound message further comprises:

causing the pre-defined message to be sent from an application of the first end user device.

20. The non-transitory computer-readable medium of claim 15, the operations further comprising:

applying a custom signature to the first outbound message prior to sending the pre-defined message.

\* \* \* \* \*